United States Patent [19]
Sakita

[11] Patent Number: 5,152,254
[45] Date of Patent: Oct. 6, 1992

[54] INTERNAL COMBUSTION ENGINE FOR VEHICLES

[76] Inventor: Masami Sakita, 1259 El Camino Real #121, Menlo Park, Calif. 94025

[21] Appl. No.: 785,741

[22] Filed: Oct. 31, 1991

[51] Int. Cl.⁵ .............................................. F02B 75/02
[52] U.S. Cl. ............................... 123/18 R; 123/197.5; 91/339; 92/121
[58] Field of Search ............... 123/18 R, 197.1, 197.5; 92/120, 121, 122; 91/339

[56] References Cited

U.S. PATENT DOCUMENTS

| | | |
|---|---|---|
| 1,189,834 | 7/1916 | Kress . |
| 1,275,616 | 8/1918 | Short . |
| 1,468,516 | 9/1923 | Schiller . |
| 1,705,826 | 3/1929 | Polizzi . |
| 1,744,542 | 1/1930 | Gough .................. 123/18 R |
| 4,058,088 | 11/1977 | Brown .................. 123/18 R |
| 4,099,448 | 7/1978 | Young .................... 91/339 |
| 4,539,941 | 9/1985 | Wang ................... 123/18 R |
| 4,823,743 | 4/1989 | Ansdale ............... 123/18 R |
| 5,025,756 | 6/1991 | Nyc ..................... 123/18 R |

FOREIGN PATENT DOCUMENTS

| | | |
|---|---|---|
| 54778 | 12/1889 | Fed. Rep. of Germany . |
| 2145564 | 3/1973 | Fed. Rep. of Germany . |
| 2256776 | 6/1974 | Fed. Rep. of Germany . |
| 8703331 | 6/1987 | PCT Int'l Appl. ........... 123/18 R |
| 577656 | 5/1946 | United Kingdom . |

Primary Examiner—David A. Okonsky
Attorney, Agent, or Firm—Victor R. Beckman

[57] ABSTRACT

An internal combustion engine (20) which includes an oscillating piston (52) and rotary valves (34) and (36) is shown. Oscillating movement of piston shaft (50) is transmitted to oscillating idler shaft (66). Outer and inner coaxial shafts (82) and (84) are connected by direction reversing gears (88) for counterrotation of the shafts. Outer shaft (82) is connected to oscillating shaft 66 through gear sets (102) and (104), and inner shaft (84) is connected thereto through gear sets (106) and (108). Gear sets (102) and (106) include one-way overrunning clutches (110) and (112), and gear sets (104) and (108) include electromagnetically controlled friction clutches. (See FIG. 1) In FIG. 13, mechanically operated clutches (200A) and (200B) are used in place of the electromagnetically controlled friction clutches shown in FIG. 1, and in FIG. 17, sector gear sets (244) and (246) connect oscillating shaft 66 to respective coaxial shafts (82) and (84). Threaded arms (300A and 300B), extend radially outwardly from oscillating shaft (50) and motors (302A and 302B) are movable along the arms for control of the moment of inertia of the oscillating shaft (50).

21 Claims, 19 Drawing Sheets

| Fig. 1A | Fig. 1B |
|---|---|

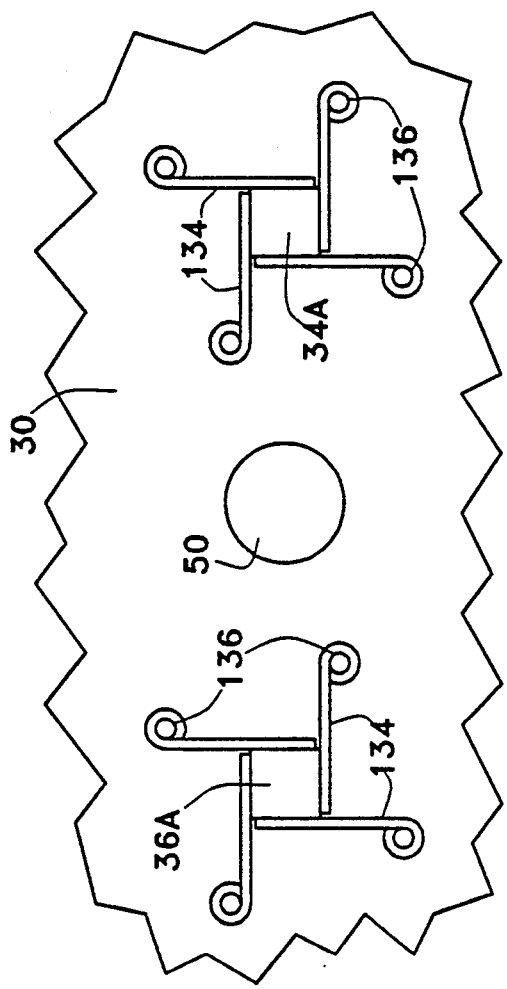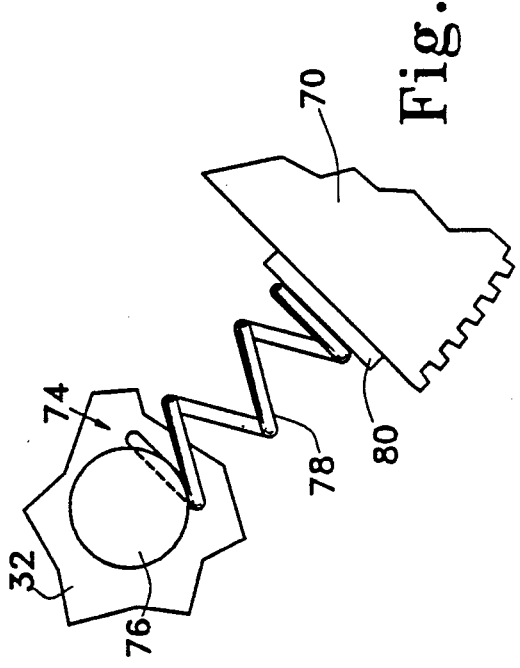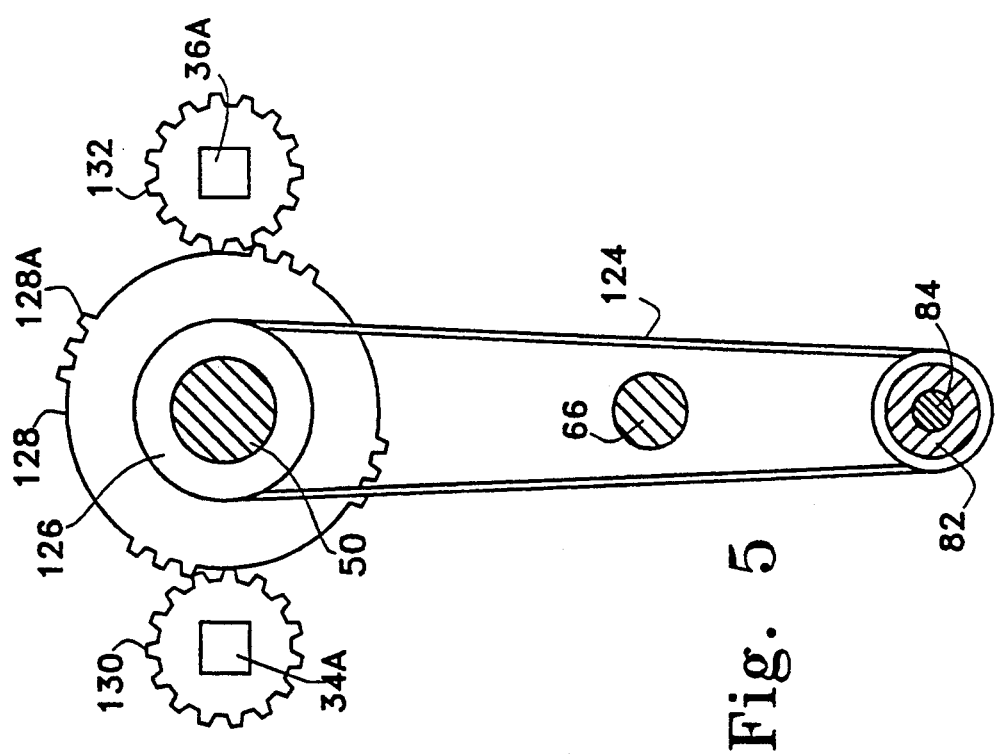
Fig. 6
Fig. 4
Fig. 5

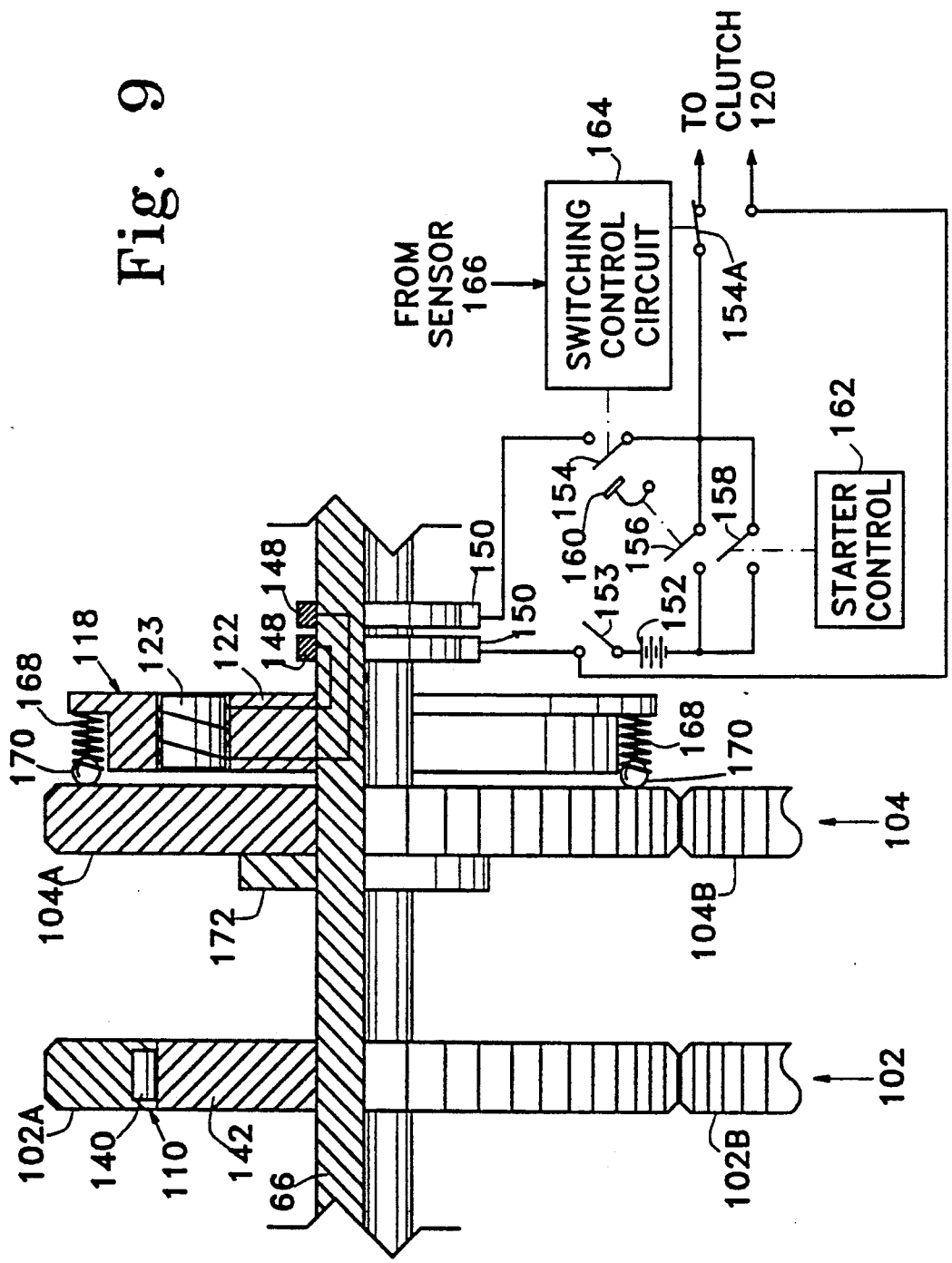

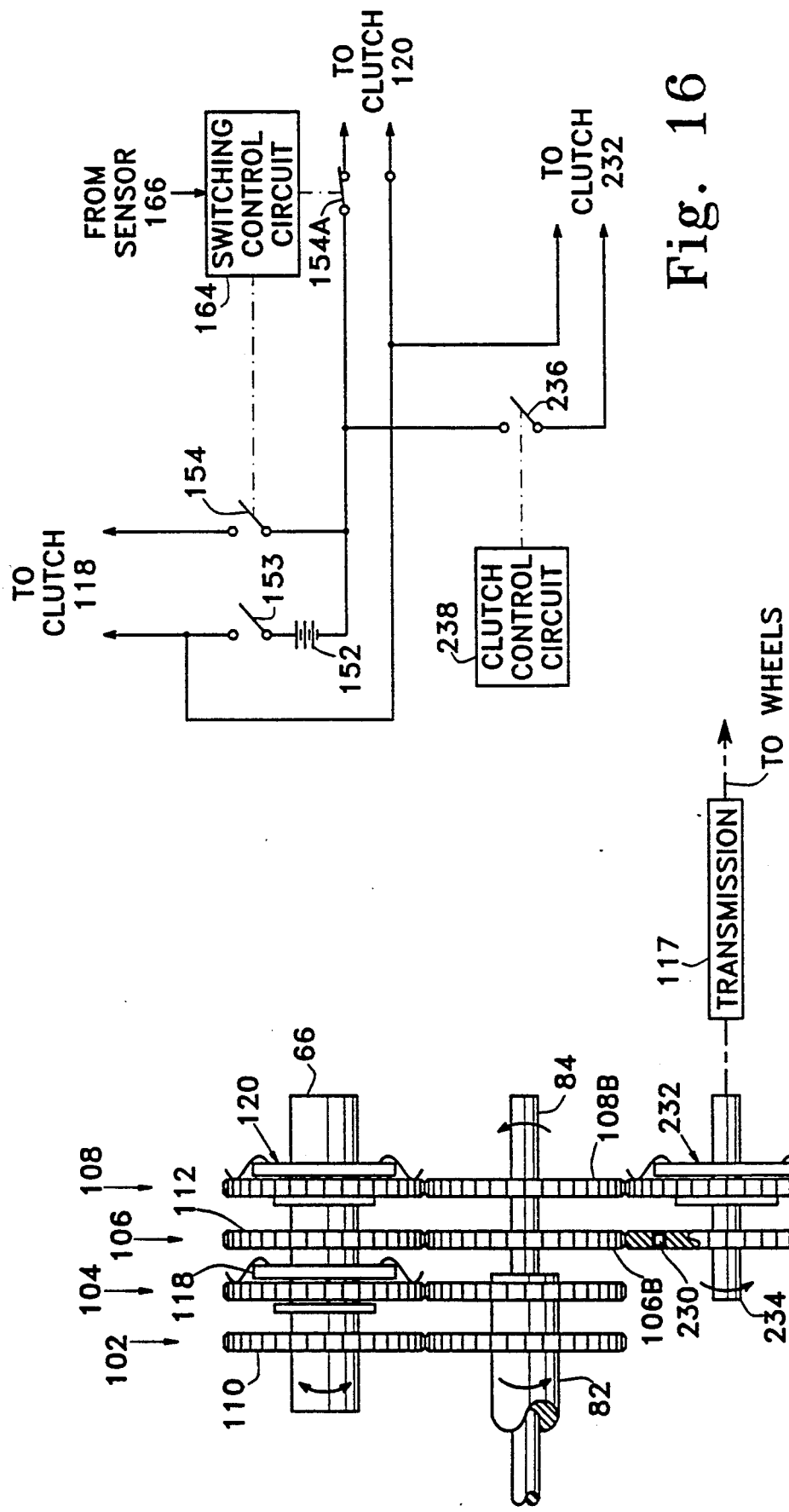

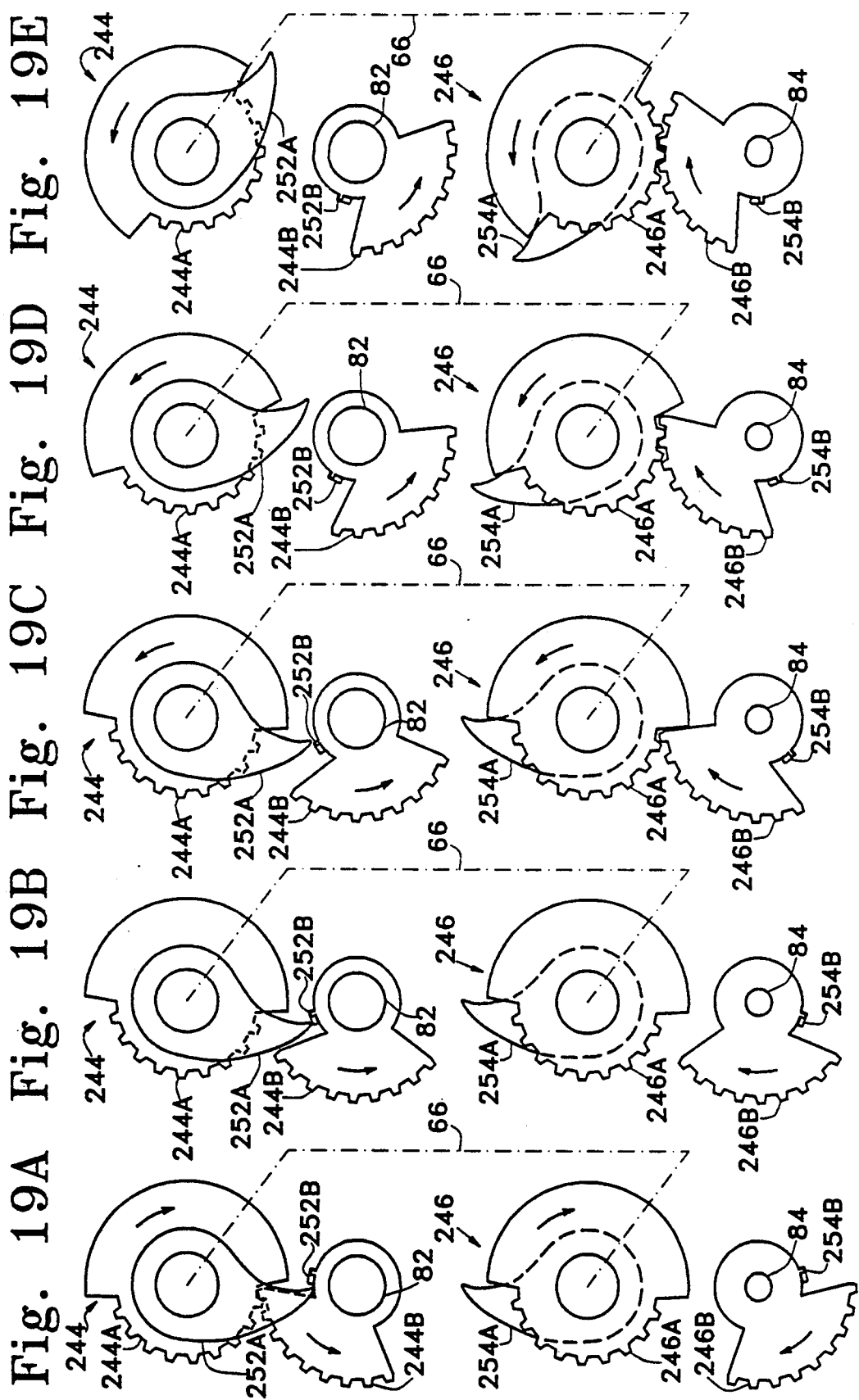

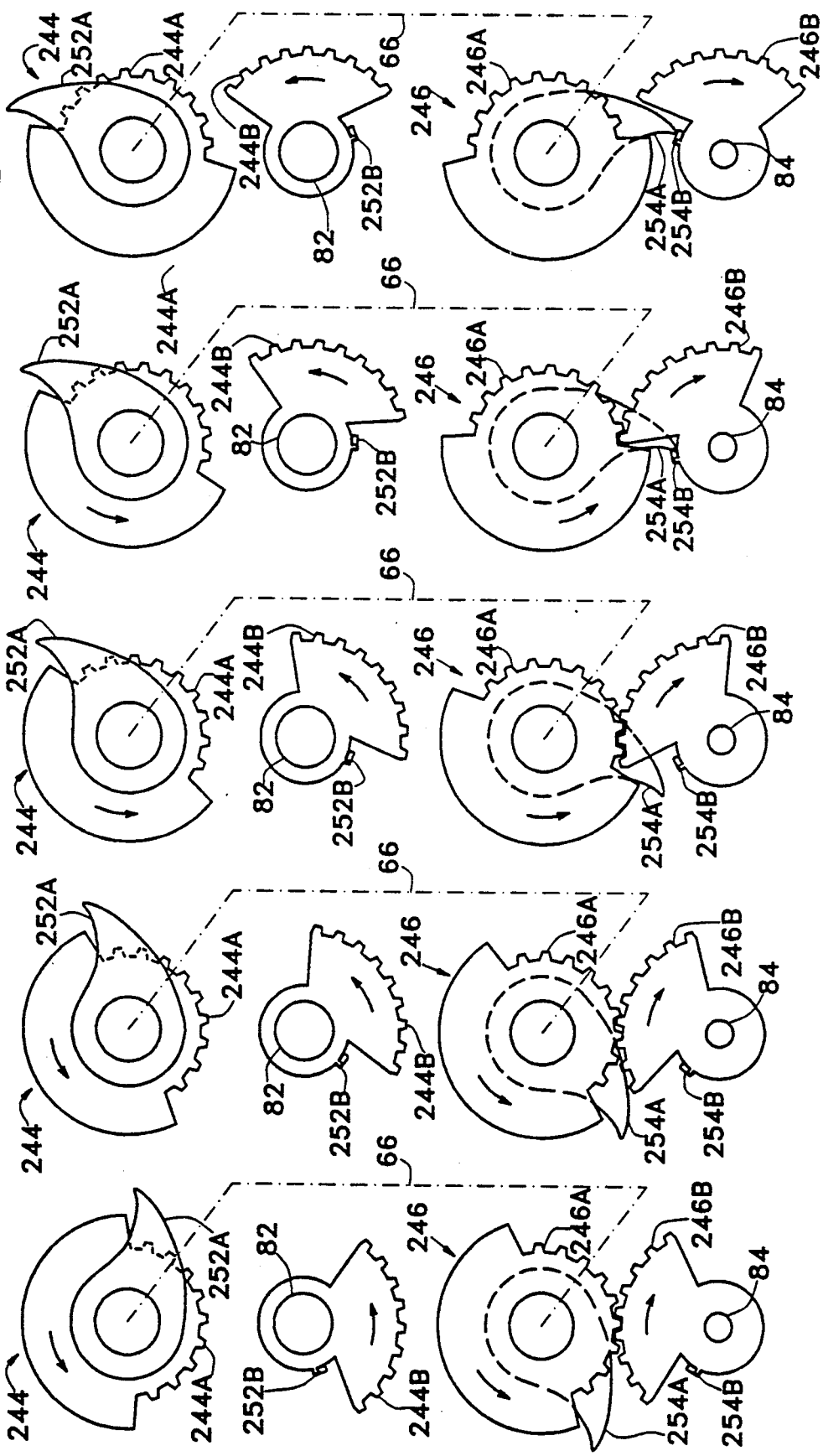

INTERNAL COMBUSTION ENGINE FOR VEHICLES

FIELD OF THE INVENTION

This invention relates generally to an internal combustion engine having an oscillating shaft and to means for converting oscillating motion of the shaft to rotary motion.

BACKGROUND OF THE INVENTION

Oscillating piston internal combustion engines are well known as shown, for example, in U.S. Pat. No. 1,189,834—Kress, U.S. Pat. No. 1,468,516—Schiller, U.S. Pat. No. 1,705,826—Polizzi, and British Patent Number 577,656—Johnson.

Many prior art internal combustion engines include a crank mechanism for connection of the engine piston to the engine output shaft. The effective length of the crank arm varies in a manner dependent upon the angular position thereof, thereby limiting engine operating efficiency.

SUMMARY AND OBJECTS OF THE INVENTION

An object of this invention is the provision of an improved internal combustion engine which is capable of high torque output.

An object of this invention is the provision of improved connecting means for connection of the oscillating shaft of an internal combustion engine to an engine output shaft.

An object of this invention is the provision of an improved internal combustion engine of the above-mentioned type which is well adapted for use in a motor vehicle.

An object of this invention is the provision of an oscillating piston engine which includes a pair of pistons which are connected for oscillation in opposite directions for improved engine balance.

The above and other objects of this invention are achieved by use of an internal combustion engine which includes movable piston means connected to an oscillating shaft. Torque on the shaft is directly dependent upon the degree of force by which the pistons are propelled upon combustion and is substantially independent of piston location along path of travel. Consequently, large torque may be applied to the oscillating shaft at combustion when the piston is at one end of travel.

The engine of this invention includes first and second counterrotating coaxial shafts rotatable in first and second opposite directions, respectively. The oscillating engine shaft is alternately connected to the first and second coaxial shafts for drive rotation of the first shaft in said first direction upon oscillation of the oscillating shaft in one direction, and for drive rotation of the second shaft in said second direction upon oscillation of the oscillating shaft in the opposite direction. The first and second coaxial shafts are interconnected for simultaneous counterrotation thereof upon rotation of either shaft by said oscillating shaft. In one embodiment which is particularly adapted for motor vehicle use, the connection of the oscillating shaft to the first coaxial shaft includes a first overrunning one-way clutch and a first actuatable friction clutch in shunt. Similarly, the connection of the oscillating shaft to the second coaxial shaft includes a second overrunning one-way clutch and second actuatable friction clutch in shunt. Either mechanical or electromagnetic clutch actuating means are provided for control of the actuatable clutches. The one-way clutches function to connect the oscillating shaft to the coaxial shafts during drive actuation of the counterrotating shafts by the oscillating piston engine. During vehicle coasting, the overrunning clutches operate in the overrunning mode whereby no braking by the engine is provided. Such free-wheeling clutch operation contributes to vehicle operating efficiency. During engine starting and vehicle braking operations, the actuatable clutches are enabled for drive actuation of the oscillating piston engine by rotation of the first and second counterrotating coaxial shafts.

In another embodiment, oscillating movement of the engine shaft is converted to rotary motion of the counterrotating coaxial shafts by first and second sector gears driven with an oscillatory motion by the oscillating piston shaft. Third and fourth sector gears are affixed to the first and second coaxial shafts, respectively, such that during engine operation the first and third sector gears and second and fourth sector gears are alternately engaged and disengaged. The first and third sector gears and second and fourth sector gears are simultaneously disengaged adjacent opposite ends of oscillating movement of the oscillating engine shaft, during which times detent means limit rotary movement of the oscillating shaft to assure reengagement of the sector gears.

In one embodiment of this invention the combustion engine includes use of a combustion unit comprising a cylinder housing formed with a partially cylindrical working chamber closed at opposite ends by plane end walls. A piston shaft rotatably supported by the end walls extends through the chamber coaxially with the partially cylindrical working chamber. A piston is affixed to the piston shaft and extends radially therefrom, which piston divides the working chamber into first and second sub-chambers. Each sub-chamber is provided with inlet and exhaust port means for the supply of air to the sub-chambers and exhaust of gases therefrom. Valve means, such as first and second rotary valves having separate intake and exhaust passages formed therein, control the flow of fluid into and out of the sub-chambers. The rotary valves are intermittently rotated ninety degrees in timed relationship with the piston oscillation, such that the operating cycle of each sub-chamber includes successive intake, compression, expansion and exhaust phases.

To compensate for unbalanced piston motion, the engine may include a pair of working chambers and associated oscillating pistons, together with means for interconnecting the piston shafts through direction-reversing means such that when one piston swings in one rotary direction, the other piston swings in the opposite rotary direction. With this arrangement, the operating cycles of the four sub-chambers may be arranged to provide an expansion phase with each swing of the piston.

In another embodiment of this invention, the engine includes reciprocating pistons which are coupled to a shaft for driving the shaft with an oscillating motion. Means, such as described above, are used to convert the oscillating shaft motion to rotary motion.

BRIEF DESCRIPTION OF THE DRAWINGS

The above and other objects and advantages of the invention will be better understood from the following description when considered with the accompany drawings. In the drawings, wherein like reference characters refer to the same parts in the several views:

FIG. 4 is an enlarged end view of resilient stop means taken along line 4—4 of FIG. 3;

FIG. 5 is a sectional view taken along line 5—5 of FIG. 3 showing means for intermittently rotating rotary engine valves;

FIG. 6 is an enlarged fragmentary end view showing resilient biasing means for releasably holding the rotary valves at 90° rotary positions;

FIG. 9 is a fragmentary sectional view showing a one-way clutch and electromagnetically controlled friction clutch for use during oscillation of the piston in one direction, together with a schematic diagram for controlling operation of the electromagnetically controlled clutch;

FIG. 15 is a side elevation view, with parts broken away, of a modified form of this invention which is similar to that shown in FIG. 1 but which includes additional clutch means in connection to the transmission;

FIG. 16 is a schematic diagram of a control circuit for control of electromagnetic friction clutches included in FIG. 15;

FIGS. 19A through 19J are diagrammatic views of the sector gears at different rotary positions during a portion of the oscillatory movement of the oscillating piston;

DESCRIPTION OF PREFERRED EMBODIMENTS

Figures 1A, 1C:
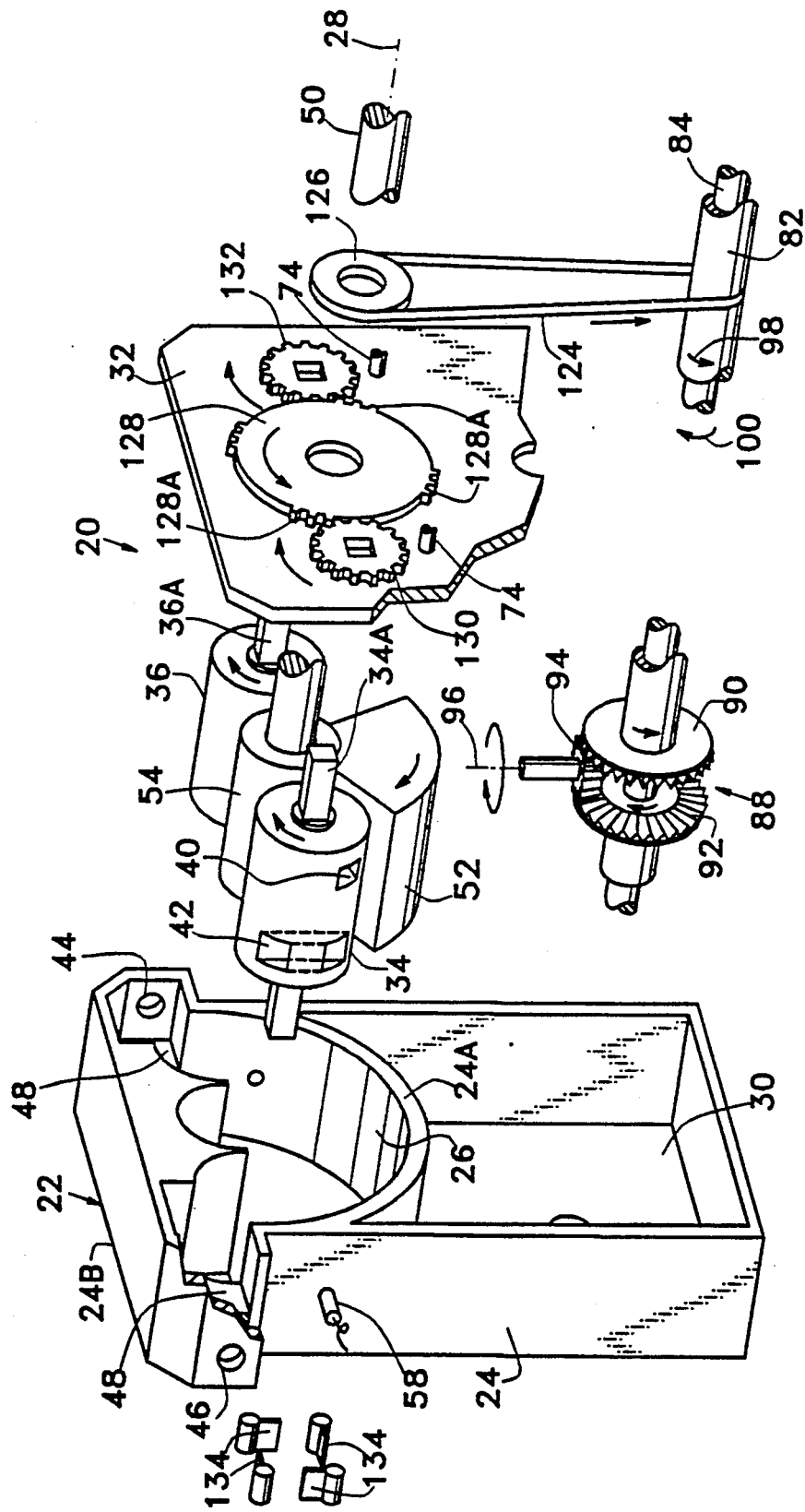
FIGS. 1A and 1B together, as shown in FIG. 1C, show an exploded isometric view, partly in section, of an internal combustion engine embodying the present invention.
Figure 1B:
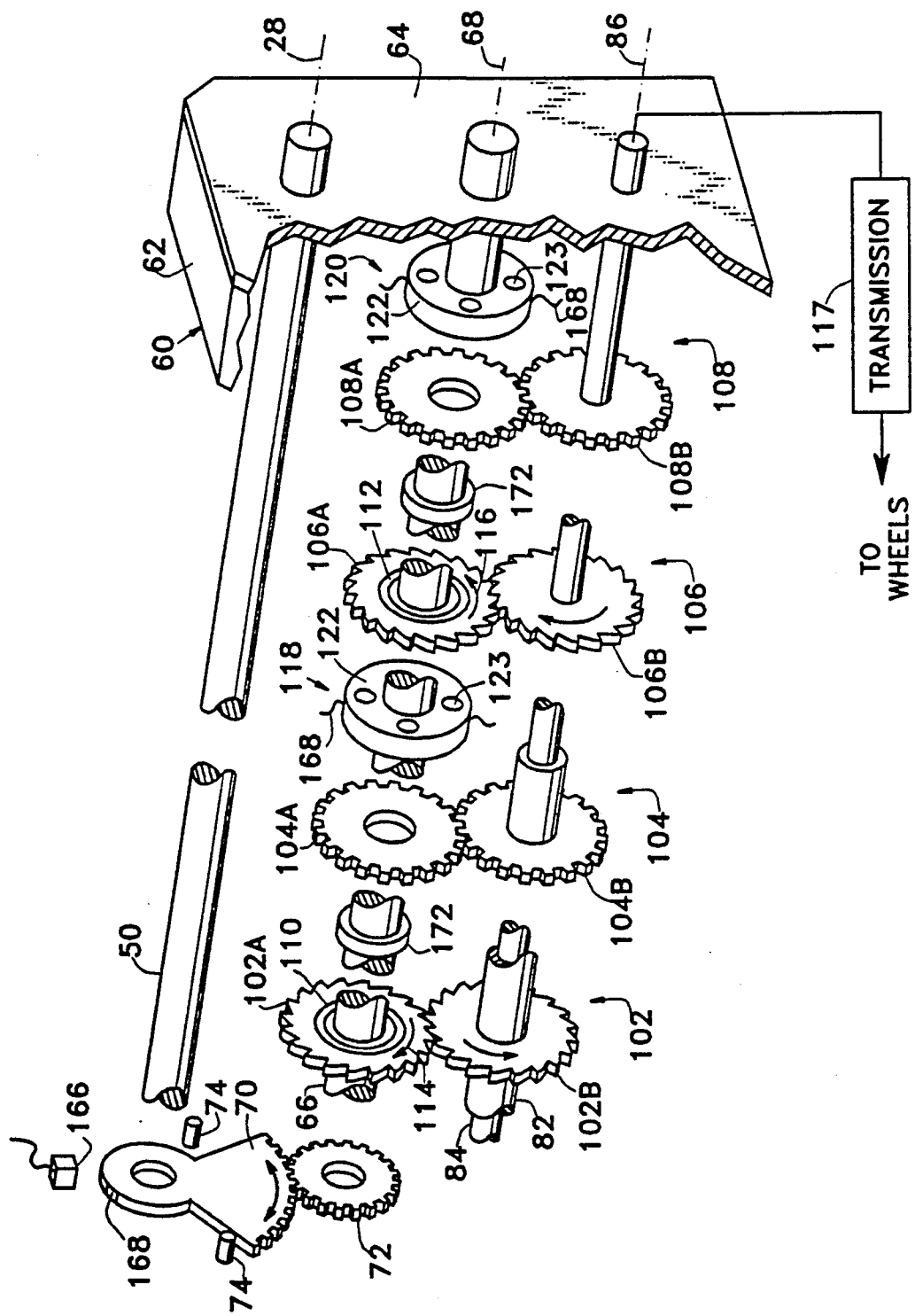
Figure 2:
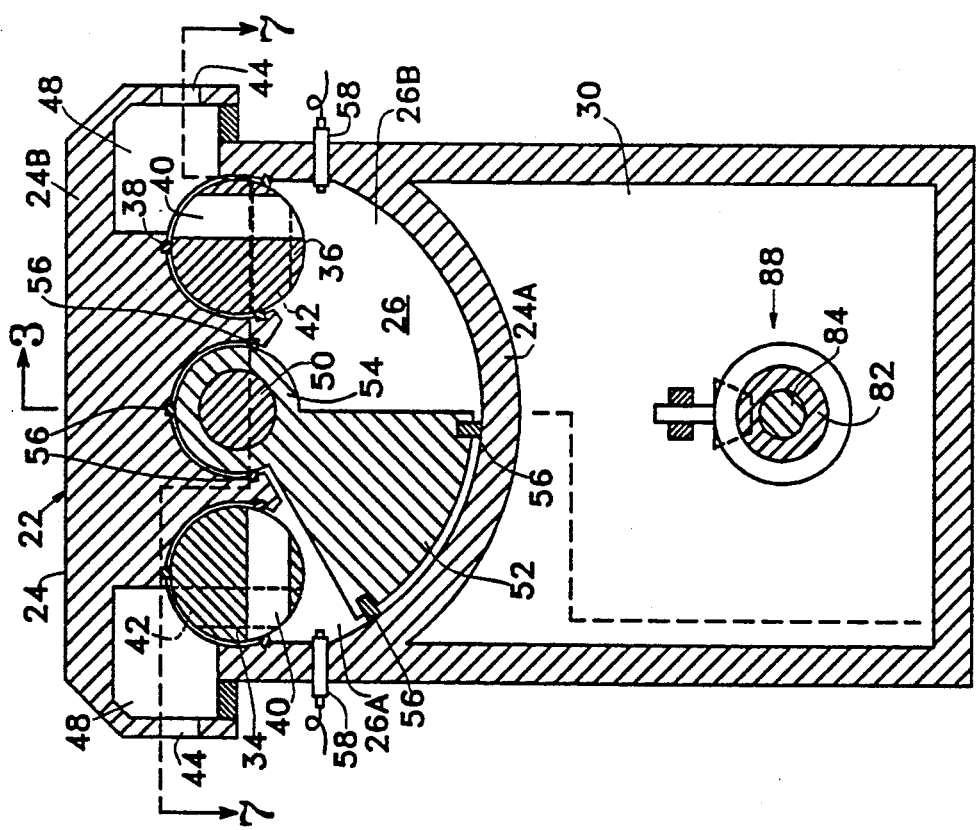
FIG. 2 is a vertical sectional view through the combustion chamber and oscillating piston portion of engine shown in FIG. 1A.

Reference first is made to FIGS. 1A, 1B and 2 wherein the novel internal combustion engine 20 of this invention is shown to include a combustion unit 22 comprising a stationary piston housing 24 formed with a partially cylindrical working chamber 26 having a longitudinal axis 28. Working chamber 26 extends between opposite end walls 30 and 32 which are attached to housing 24 by any suitable means not shown. In practice, housing 24 is formed with separate block and removable head sections to provide ready access to rotary valves 34 and 36. It here will be noted that although rotary valves are illustrated, conventional poppet valves may be employed in place thereof, the invention not being limited to the use of rotary valves. Valves 34 and 36 are journaled to end walls 30 and 32 by bearings, not shown, for rotary motion about axes that extend parallel to axis 28. Seal means 38 (see FIG. 2) in grooves in housing 24 provide for sealing engagement between the valves and housing. Each valve is provided with an inlet passage 40 and outlet passage 42 adapted for communication with inlet ports 44 and exhaust ports 46, respectively, in the engine housing. Transverse dividing walls 48,48 in housing 24 separate the inlet and exhaust ports. An air/fuel mixture from a source not shown, such as a carburetor, is supplied to the engine through inlet ports 44.

A piston shaft 50 is journaled to end walls 30 and 32 by bearings, not shown, for oscillating pivotal movement about axis 28. A single piston, or vane, 52 is affixed to shaft 50 for rotation therewith about axis 28. Piston 52 is formed with a hub 54 through which piston shaft 50 extends for attachment of the piston to the shaft. Seal means 56 provide sealing engagement between the piston and working chamber.

The piston 52 divides working chamber 26 into two sub-chambers 26A and 26B, one of which increases in volume while the other decreases during oscillation of piston 52 therein. Both sub-chambers 26A and 26B are provided with ignition devices 58, such as spark plugs, for ignition of compressed air/fuel mixtures in the sub-chambers and oscillation of piston 52 in the working chamber.

A drive train housing 60 is attached to one end of combustion unit 22 at end wall 32 by means not shown. It includes an outer wall 62 and end wall 64. Piston shaft 50 also is journaled to end wall 64 by bearing means not shown. An idler shaft 66 extends through housing 60 and is journaled to end walls 32 and 64 by bearings, not shown, for rotation about axis 68 parallel to piston axis 28. Sector gear 70 attached to piston shaft 50 and cooperating gear 72 attached to idler shaft 66 transmit oscillatory motion of the piston shaft to the idler shaft. By selection of the gear ratio between gears 70 and 72, the idler shaft may be provided with the desired degree of oscillatory rotation. If desired, non-circular gears may be employed. Also, as will be apparent, if the oscillatory piston shaft 50 undergoes the desired angular rotational movement, there would be no need for idler shaft 66 and associated gears 70 and 72 connecting the same to piston shaft 50.

Oscillatory travel of piston 52 is limited by stop means 74,74 affixed to end wall 32, which stop means are engaged by sector gear 70 at opposite ends of travel thereof. In FIG. 4, the stop means 74 is shown to include an arm 76 extending from end wall 32 to which spring 78 is affixed. An abutment pad 80 is attached to the outer end of spring 78, and is adapted for engagement with the edge of sector gear 70 to limit rotation thereof. The spring cushions the impact and facilitates reversal of the piston movement.

The engine includes first and second coaxial shafts 82 and 84, the outer one 82 of which is journaled to end wall 32, and the inner one 84 of which is journaled to end walls 30 and 64. The axis 86 of the coaxial shafts 82 and 84 extends parallel to axis 68 of idler shaft 66 and axis 28 of piston shaft 50. Means 88 are provided for interconnecting said coaxial shafts 82 and 84 for simultaneous counterrotation thereof upon rotation of either one thereof. For purposes of illustration, means 88 are shown to include first and second bevel gears 90 and 92 affixed to outer and inner shafts 82 and 84, respectively, and idler gear 94 between said first and second bevel gears, which idler gear is adapted for rotation about axis 96 normal to axis 86. In the illustrated arrangement, outer shaft 82 is adapted for rotation in the direction of arrow 98 while inner shaft 84 is adapted for counterrotation, in the direction of arrow 100, as seen in FIG. 1A.

Idler shaft 66 is adapted for connection to outer shaft 82 through first gear set 102 which includes spur gears 102A and 102B, and second gear set 104 which includes spur gears 104A and 104B. Similarly, idler shaft 66 is adapted for connection to inner shaft 84 through first gear set 106 which includes spur gears 106A and 106B, and second gear set 108 which includes spur gears 108A and 108B. Gears 102A and 106A of gear sets 102 and 106 include, or incorporate, one way clutches 110 and 112, respectively, whereby gear 102A is adapted to be driven in a clockwise direction(in the direction of arrow 114 as seen in FIG. 1B) upon rotation of idler shaft 66 in that direction, and gear 106A is adapted to be driven in a counterclockwise direction (in the direction of arrow 116) upon rotation of idler shaft in the counterclockwise direction. Consequently, outer shaft 82 is rotated in direction of arrow 98, and inner shaft 84 is rotated in the opposite direction, in the direction of arrow 100, when driven by operation of the oscillating piston engine. Either shaft 82 or 84, or both shafts, may be employed as the engine output shaft, and for purposes of illustration, shaft 84 is shown connected to a transmission 117. For vehicular use, the output from the transmission is adapted for connection to vehicle wheels for driving the same.

Gears 104A and 108A are rotatably mounted on idler shaft 66, and are included in first and second actuatable clutch means 118 and 120, respectively. For purposes of illustration, clutch means 118 and 120 are shown comprising electromagnetically controlled friction clutches each of which includes a housing 122 attached to oscillating idler shaft 66. Electromagnets 123 are carried by the housings which when energized, attract spur gears 104A and 108A thereto. Gears 104A and 108A are rotatably mounted on idler shaft 66 such that when the electromagnets are deenergized, they remain uncoupled to the shaft. The gears are drawn into tight frictional engagement with housings 122 when the electromagnets are energized for coupling of the gears to the idler shaft. The clutch means are shown in greater detail in FIG. 9 described hereinbelow. For present purposes, it will be understood that actuatable clutch means 118 and 120 are alternately energized and deenergized whenever drive actuation of the engine by the counterrotating shafts 82 and 84 is desired as, for example, during engine starting and vehicle braking.

Since coaxial shafts 82 and 84 simultaneous rotate in opposite directions, either one, or both, may be employed as the engine output shaft. In the illustrated embodiments, rotary valves 34 and 36 are intermittently rotated by connection thereof to outer coaxial shaft 82 through a belt 124 and pulley 126. Pulley 126 is fixedly attached to a gear wheel 128 and together, are rotatably mounted on piston shaft 50. Gear wheel 128 is provided with gear segments 128A at the four quadrants thereof which are adapted for intermittent engagement with gear wheels 130 and 132 upon rotation of gear wheel 128. Gear wheels 130 and 132 are, in turn, connected to valves 34 and 36 through square valve shafts 34A and 36A extending from the valve for intermittent rotation of the valves upon continuous rotation of gear wheel 128. An enlarged elevational view of this mechanism is shown in FIG. 5.

Figure 7:
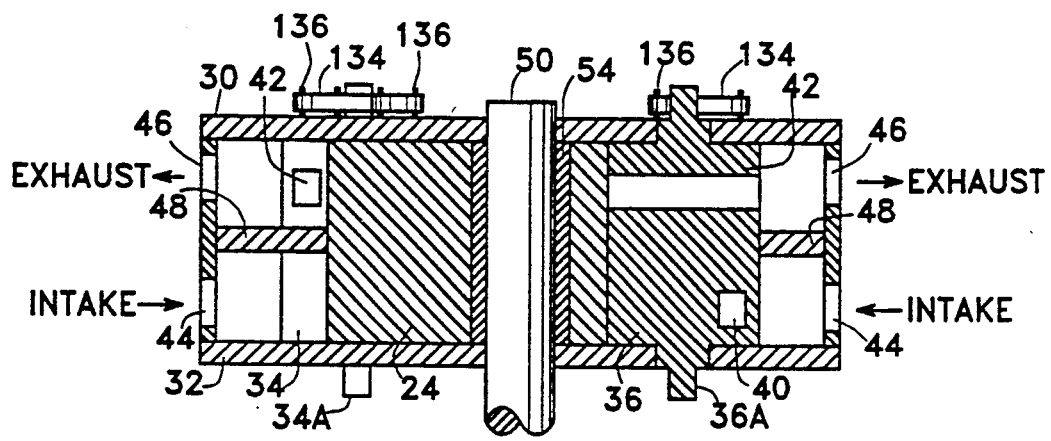
FIG. 7 is a sectional view taken along line 7—7 of FIG. 2.

The opposite ends of square valve shafts 34A and 36A extend outwardly from end wall 30, and are engaged by leaf springs 134, one end of which springs are affixed to arms 136 extending from end wall 30, as seen in FIGS. 6 and 7. Springs 134 function to resiliently hold the rotary valves at 90° rotary positions. They also provide an over-center snap action function to the valve rotation following rotation beyond 45°, and stably locate the valves at the ninety degree positions. With this arrangement, the valves need not be positively rotated a full 90 degrees by gear teeth 128A to provide for the required 90 degree rotations.

Figures 8A, 8B:
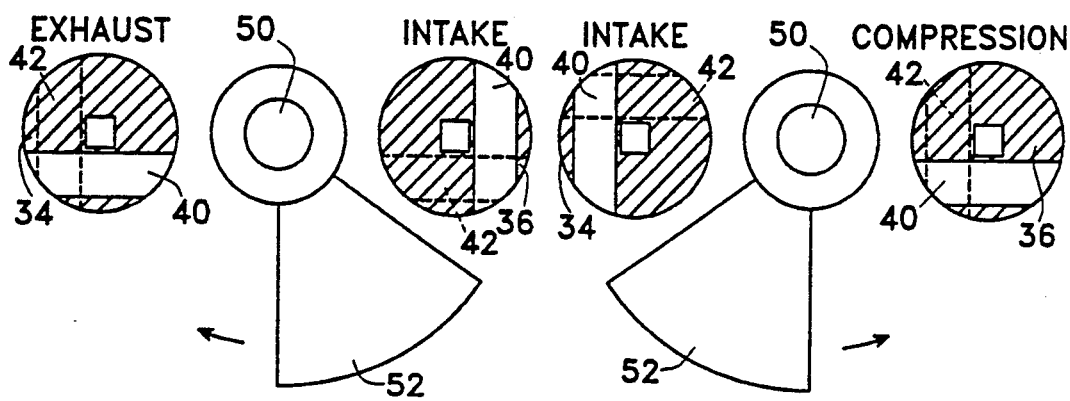
FIGS. 8A through 8D schematically illustrate positions of the oscillating piston and rotary valves for the exhaust, intake, compression and expansion, or power, phases for the two sub-chambers of the engine.
Figures 8C, 8D:
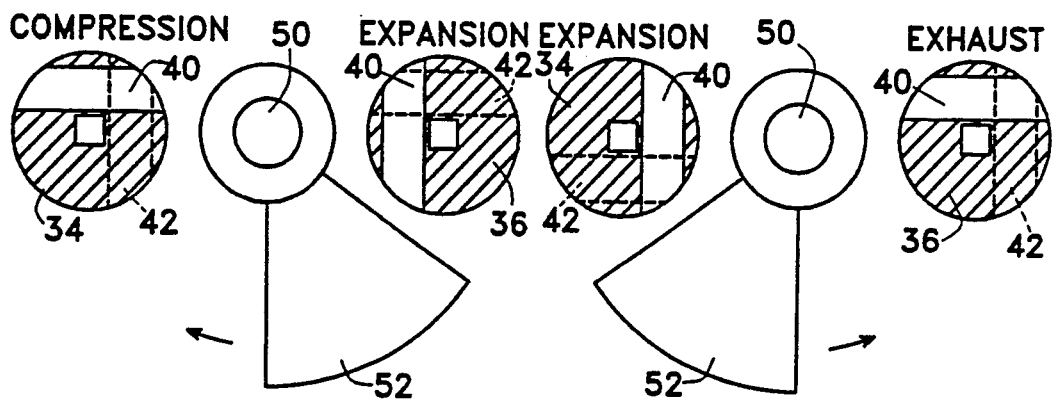

An engine operating cycle for each sub-chamber is diagrammatically illustrated in FIGS. 8A through 8D, to which figures reference now is made. As described above, rotary valve 34 is associated with sub-chamber 26A and rotary valve 36 is associated with sub-chamber 26B. In FIG. 8A, during clockwise rotation of piston 52, sub-chamber 26A undergoes an exhaust phase through valve 34 while a fuel/air mixture is drawn into sub-chamber 26B through valve 36. Next, when the piston swings back with a counterclockwise motion, fuel/air mixture is drawn into sub-chamber 26A through valve 34, and the fuel/air mixture in sub-chamber 26B is compressed. (See FIG. 8B.) Then, when piston 52 again swings in a clockwise direction as shown in FIG. 8C, the fuel air mixture in sub-chamber 26A is compressed, and the compressed fuel/air mixture in sub-chamber 26B is ignited for production of a power, or expansion, phase at sub-chamber 26B. Next, when piston 52 again swings in a counterclockwise direction as shown in FIG. 8D, the compressed fuel/air mixture in sub-chamber 26A is ignited for production of an expansion phase at sub-chamber 26A, and exhaust gases are expelled from sub-chamber 26B through valve 36. As described above, with each clockwise rotation of idler shaft 66, by counterclockwise rotation of piston shaft 50, one-way clutch 110 is in driving condition for drive actuation of outer shaft 82 through gear set 102, during which time one-way clutch 112 operates in the overrunning condition. Conversely, during counterclockwise rotation of idler shaft 66 through gears 70 and 72, one-way clutch 112 is in driving condition for drive actuation of inner shaft 84 through gear set 106, during which time one-way clutch 110 operates in the overrunning condition. So long as actuatable clutches 118 and 120 remain deenergized, they do not affect operation of the drive train.

Reference now is made to FIG. 9 wherein clutches 110 and 118 associated with gear sets 102 and 104 are shown in greater detail. As noted above clutches 112 and 120 associated with gear sets 106 and 108 are of the same types as clutches 110 and 118, respectively, such that a separate detailed showing thereof is not required. Clutch 110 comprises a one-way, or overrunning, clutch of any suitable design and, for purposes of illustration, may comprise rollers 140 located between spur gear 102A and inner member 142 attached to shaft 66. Rollers 140, one of which is seen in FIG. 9, cooperate with cam surfaces on member 142 to provide for clutch engagement, or clutch override, dependent upon the direction of rotation of shaft 66. Spring means, not shown, urge the rollers into engagement with members 102A and 142.

Figure 3:
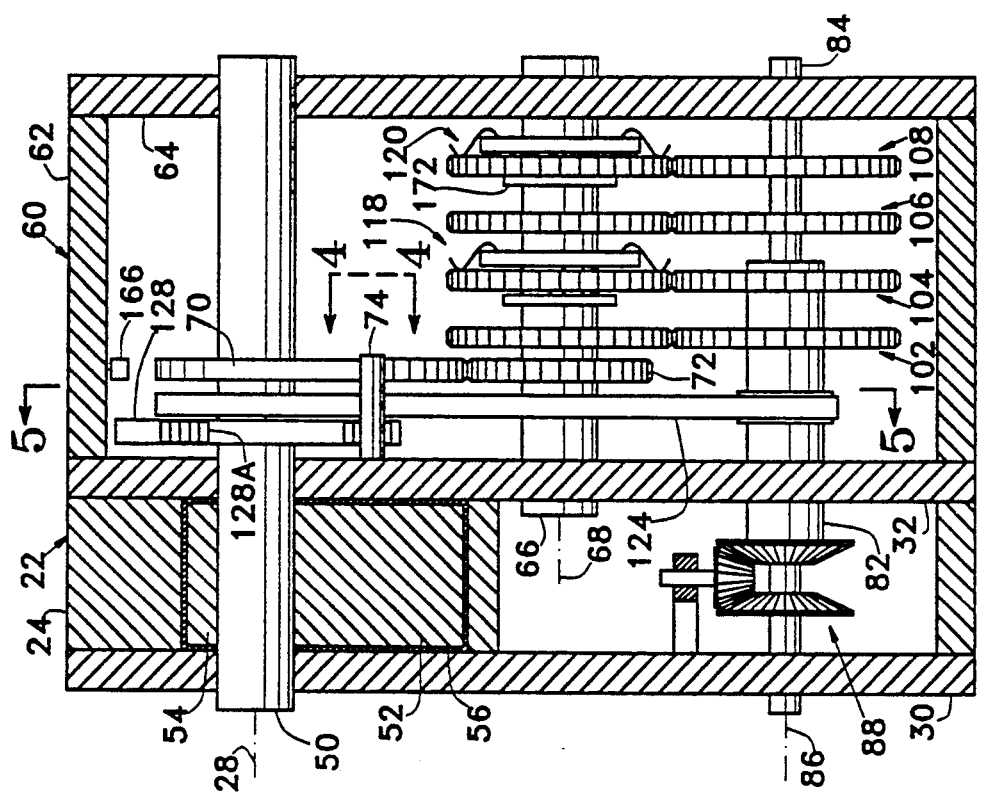
FIG. 3 is a sectional view taken substantially along line 3—3 of FIG. 2.

Actuatable clutch 118 is shown to comprise housing 122 affixed to shaft 66 and containing electromagnets 123, one of which is shown in FIG. 9. Electromagnets 123 are connected to slip rings 148,148 which, in turn, are connected through brushes 150,150 to a voltage source 152 through ignition controlled switch 153, switch 154, and one of shunt-connected switches 156 or 158. Switch 153 is closed whenever the vehicle is placed in operating condition by closure of the ignition switch. Switches 156 and 158 normally are in an open condition, and are adapted for closure upon actuation of the vehicle brakes by brake lever 160, and by operation of the vehicle starter under control of starter control circuit 162, respectively. Switch 154, on the other hand, is alternately opened and closed under control of switching control circuit 164. Timing pulses for control of switch control circuit 164 are obtained from a photocell 166, shown in FIGS. 1B and 3, responsive to timing lines 168 provided on the edge of sector gear 70. Timing pulses are produced in synchronism with oscillation of the engine piston. In operation, switch 154 is, essentially, closed during motion of the piston in one direction, and is opened during motion in the opposite direction such that actuated clutch 118 functions as a one-way clutch. Means, not shown, are provided for the generation of a signal responsive to the direction of oscillatory motion, for use by control circuit 164. Similar control means, including switch 154A which is alternately opened and closed under control of circuit 164, are provided for controlling operation of actuatable clutch means 120 for connection of shaft 66 to inner shaft 84 for intermittent drive rotation of shaft 66 by inner shaft 84 during starting or braking operations. It here will be noted that timing pulses from photocell 166 also may be used for ignition timing purposes for controlling firing of spark plugs 58.

During energization of solenoids 123, spur gear 104A is drawn into tight frictional engagement with housing 122 for rotation of shaft 66 through gear set 104. In the deenergized condition of solenoids 123 illustrated in FIG. 9, gear 104A is axially moved away from housing 144 by spring biasing means 168 extending between the housing and gear. Ball bearings 170 reduce friction between the spring and gear when the clutch is disengaged, and an annular stop member 172 on shaft 66 limits axial movement of gear 104A to the left as viewed in FIG. 9. In FIG. 1B, the spring biasing means 168 are diagrammatically illustrated as "S" shaped members.

Figure 10:
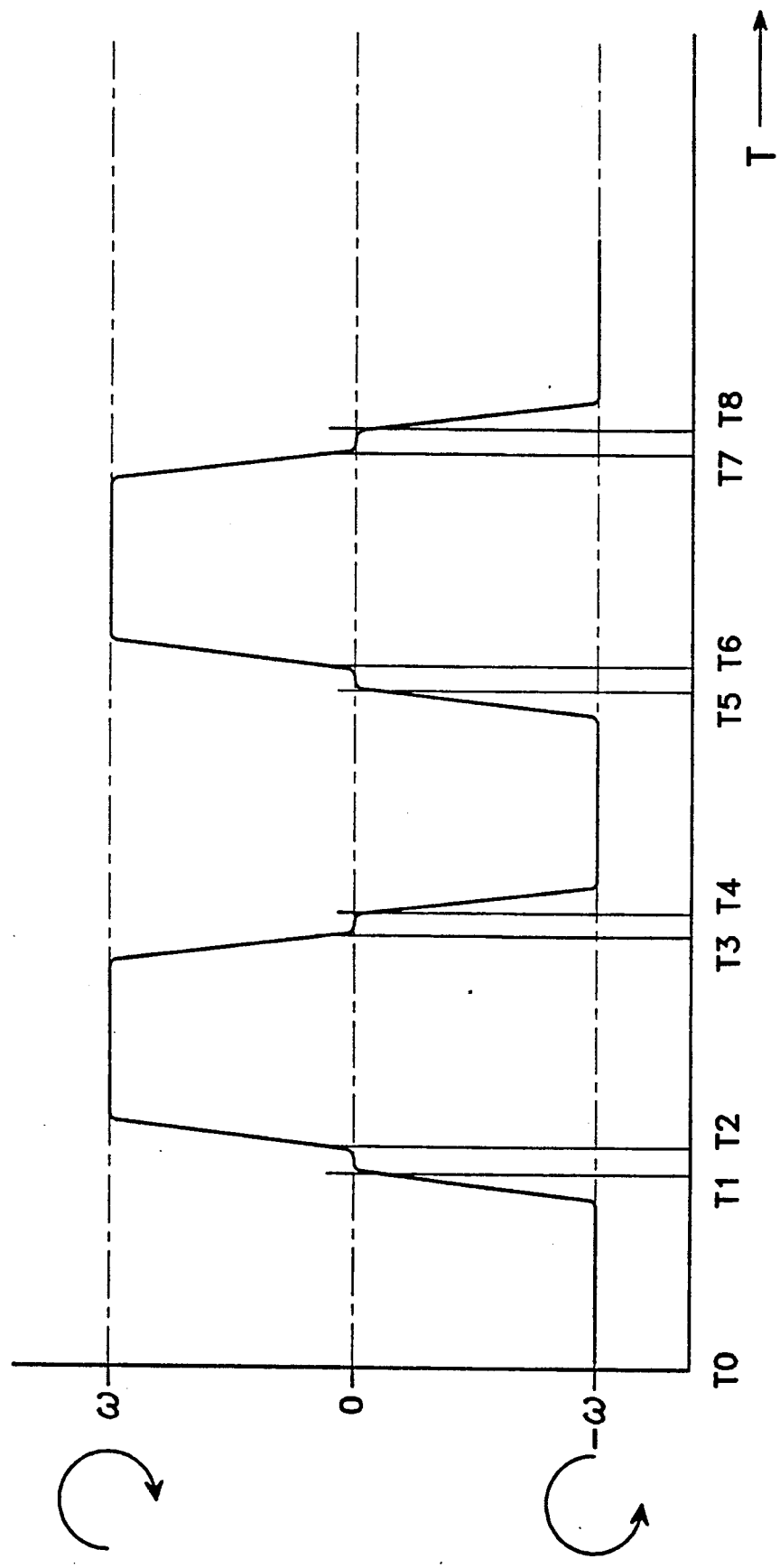
FIG. 10 is a diagram showing angular rate of rotation of the oscillating piston versus time.

Reference now is made to the timing diagram of FIG. 10 wherein angular rate of rotation of the oscillating piston versus time is shown for operation when switch 156 is closed during braking operation and/or switch 158 is closed during starting operation. At time T0, switch 154 is closed whereby clutch 118 is in the energized condition for engagement thereof, and switch 154B is open whereby clutch 120 is in the deenergized condition for disengagement thereof. If, at this time, the speed at which shaft 66 is being driven by the engine relative to the speed at which outer shaft 82 is rotated by the starter, or by vehicle movement during braking, is such that both overrunning clutches 110 and 112 operate in the overrunning condition, then piston shaft 50 is driven in a counterclockwise direction by the rotating outer shaft 82. Under these conditions shaft 82 comprises the driving shaft, and piston shaft 50 comprises the driven shaft through operation of electromagnetic friction clutch 118. During braking, the engine thereby assists in the braking function. At time T1, near the end of piston travel in the counterclockwise direction, switch 154 opens whereby both clutch 118 and clutch 120 are deenergized. Shortly thereafter, the piston stops and the direction of oscillation is reversed. After changing to a clockwise direction of rotation, clutch 120 is energized at time T2 for engagement thereof for drive actuation of the piston shaft in the clockwise direction by the rotating inner shaft 84. At time T3, clutch 120 is deenergized and, after the direction of oscillation again reverses to the counterclockwise direction of rotation, clutch 118 is energized at time T4. Successive energization and deenergization of clutches 118 and 120 continue so long as brake switch 156 or starter switch 158 remains closed, and coaxial output shafts 82 and 84 continue to rotate. While output shafts 82 and 84 function as driving shafts, and piston shaft 50 functions as the driven shaft, both one-way clutches 110 and 112 continuously operate in the overrunning condition. When piston shaft 50 functions as the driving shaft, overrunning clutches 110 and 112 operate whereby coaxial shafts 82 and 84 alternately function as driven and overrunning shafts regardless of operation of the actuatable clutches 118 and 120.

Figure 11:
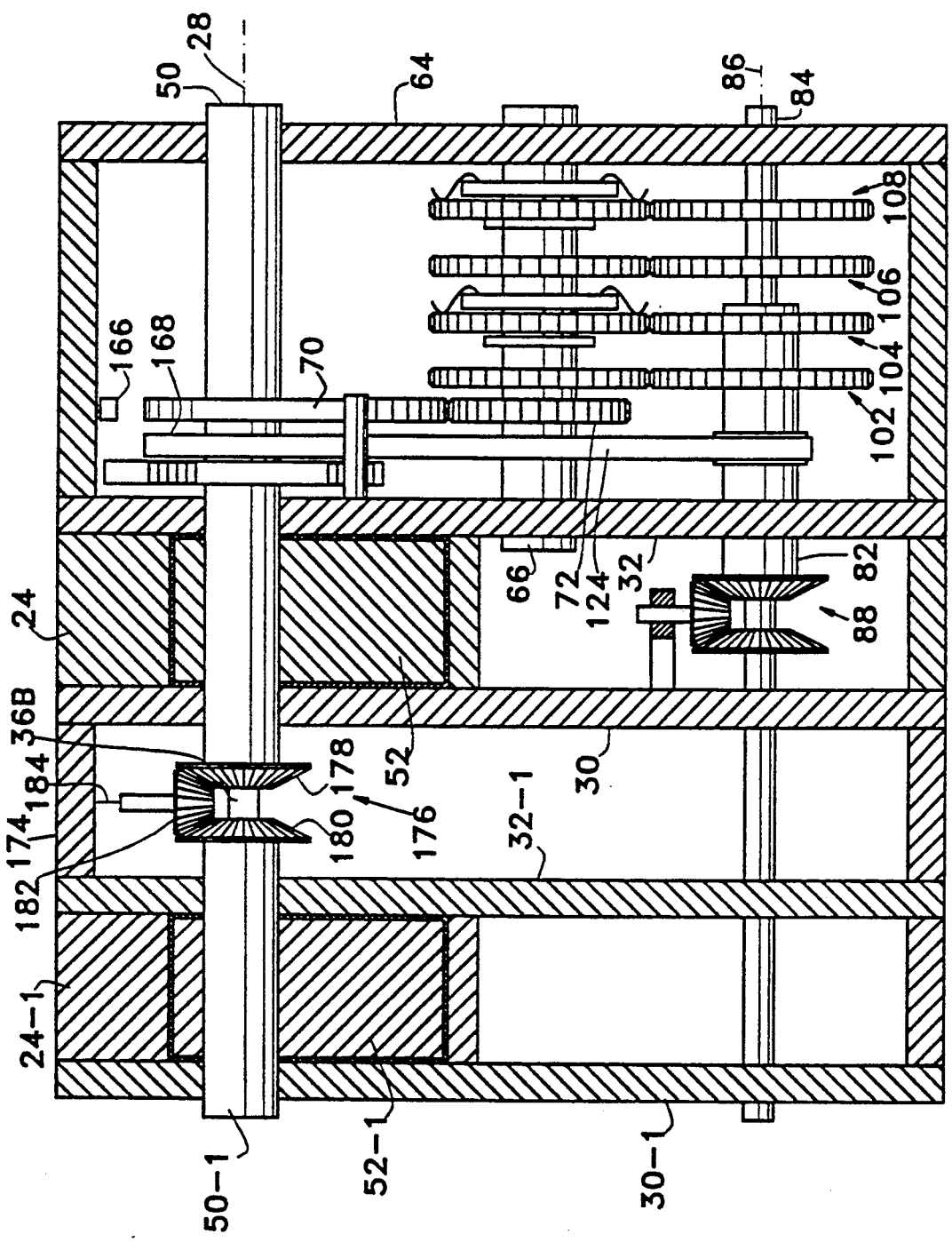
FIG. 11 is a sectional view which is similar to that of FIG. 3 but showing an engine which includes two operating chambers and associated pistons.

Obviously, the engine is not limited to use of a single piston. Reference now is made to FIG. 1 wherein a multipiston engine is shown which includes first and second pistons 52 and 52-1. Piston shaft 50 to which piston 52 is affixed is connected to coaxial output shafts 82 and 84 in the manner described above. The illustrated engine includes a second housing 24-1 of the same design as housing 24, which housings 24 and 24-1 are interconnected by a housing 174. Housing 24-1 also is provided with a pair of rotary valves of the same type as rotary valves 34 and 36. Valves 34 and 36 are connected to corresponding rotary valves in housing 24-1 by axial extensions of the valve shafts. In FIG. 11, a portion of one such extension 36B for connection of valve 36 to the corresponding valve in housing 24-1 is shown.

Piston 52-1 is affixed to piston shaft 50-1 which, in turn, is journaled to end walls 30-1 and 32-1. Piston shafts 50 and 50-1, which are axially aligned, are adapted for simultaneous pivotal movement about axis 28. They are interconnected by reversing means 176 for simultaneous pivotal movement in opposite directions. Reversing means 176 may be of the same type as means 88 for interconnecting the coaxial output shafts 82 and 84. It is shown comprising a first bevel gear 178 attached to one end of piston shaft 50, second bevel gear 180 attached to the opposing end of shaft 50-1, and an idler gear 182 between gears 178 and 180, which idler gear is adapted for rotation about axis 184 normal to axis 28. By interconnecting the piston shafts through direction reversing means, one shaft is made to rotate in one direction while the other is rotated in the opposite direction for reducing engine vibration.

In operation of the single piston engine illustrated in FIG. 8A through 8D, successive expansion, or power, phases are seen to take place in the course of one complete back and forth movement of the oscillating piston. These power phases are followed by non-power phases during the following complete back and forth movement of the piston. With the two-piston engine shown in FIG. 11, a power phase is provided every movement of the pistons. Simultaneous exhaust, intake, compression and expansion phases take place at the four sub-chambers of the two-piston engine every swing of the pistons. Consequently, a compression phase in one sub-chamber is accompanied by an expansion phase in another sub-chamber to further contribute to engine balance. Obviously, the engine may be provided with additional oscillating pistons if desired.

Figure 12:
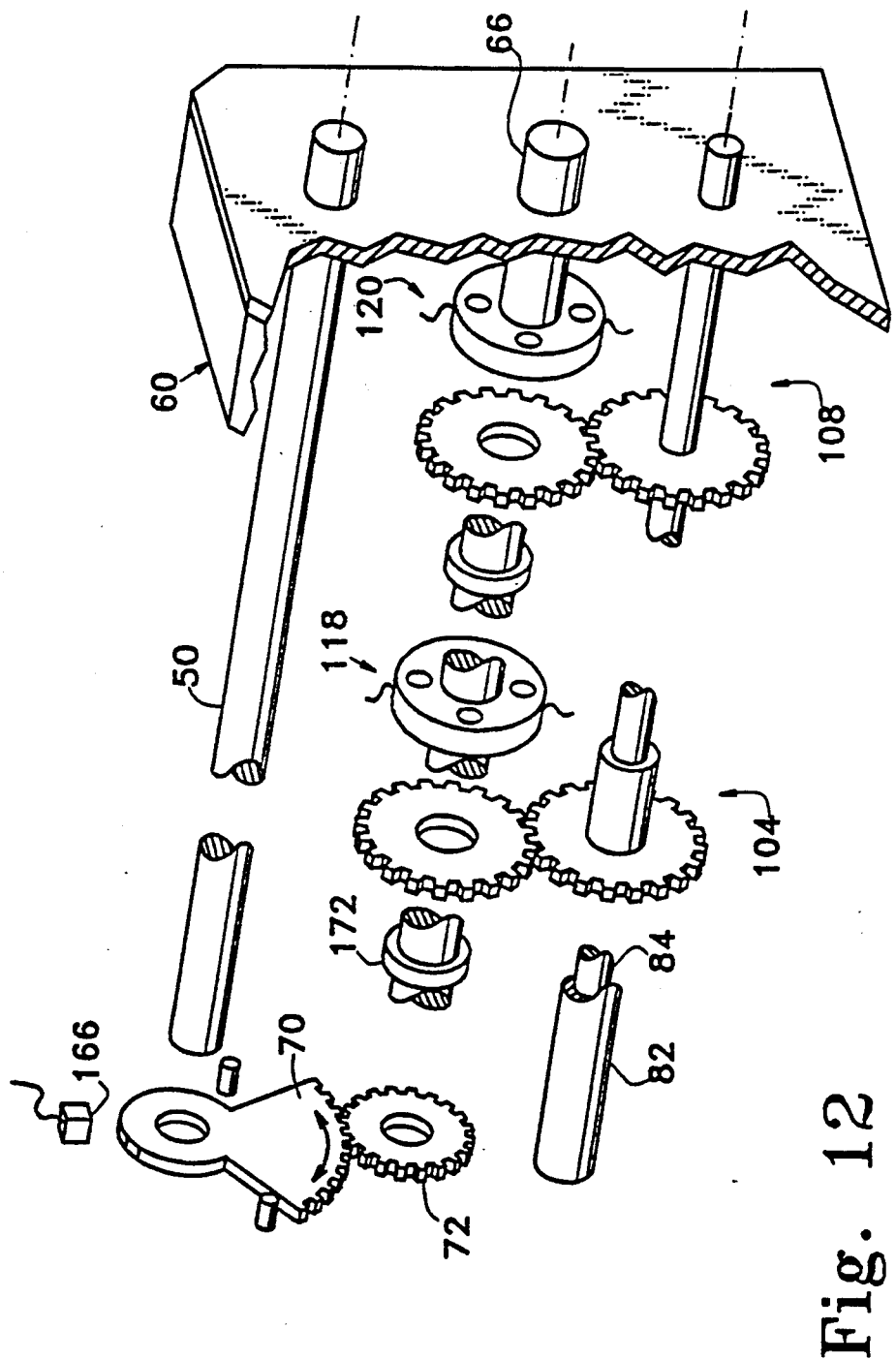
FIG. 12 is a fragmentary exploded isometric view which is similar to that of FIG. 1 but without one-way clutches.

Reference now is made to FIG. 12 wherein a modified form of this invention is shown which includes first and second actuatable clutch means 118 and 120 of the type described above included in the connection of the oscillating piston shaft 50 to the counterrotating output shafts 82 and 84. The embodiment of FIG. 12 differs from the above-described arrangements in the elimination of one-way, overrunning, clutches in shunt with the actuatable clutches 118 and 120. Clutch actuating circuits of the general type illustrated in FIG. 9 may be used, in which one terminal of battery 152 is directly connected to switches 154 and 154A rather than being connected thereto through switch 156 or switch 158. With this arrangement, operation of the clutches is dependent upon closure of ignition-controlled switch 153, and not upon actuation of the brakes or energization of the starter motor. So long as ignition-controlled switch 153 is closed, opening and closing of switch 154 controls engagement and disengagement of clutch 118. Clutch 120 is controlled in a similar manner through switch 154A. Timing of the operation of clutches 118 and 120 is the same as that illustrated in FIG. 10 described above. With this novel clutch and clutch actuating means, piston shaft 50 may be driven by the counterrotating output shafts 82 and 84 any time during engine operation, independently of operation of the brakes or operation of the starter.

Figure 13:
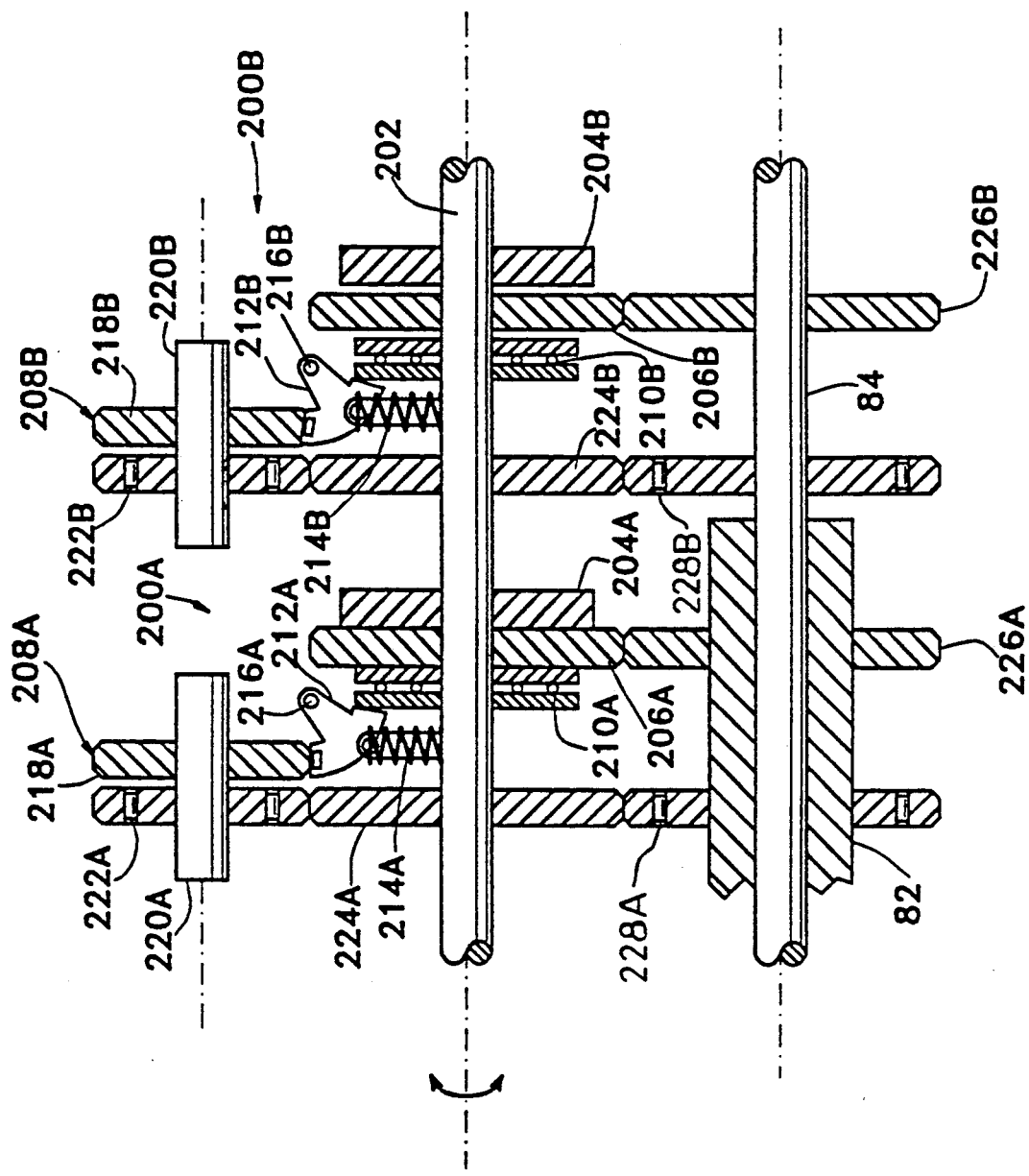
FIG. 13 is a cross-sectional view of a modified form of this invention employing mechanically controlled actuatable clutches in the drive train in place of the electromagnetically controlled friction clutches shown in the FIG. 1 embodiment.
Figure 14:
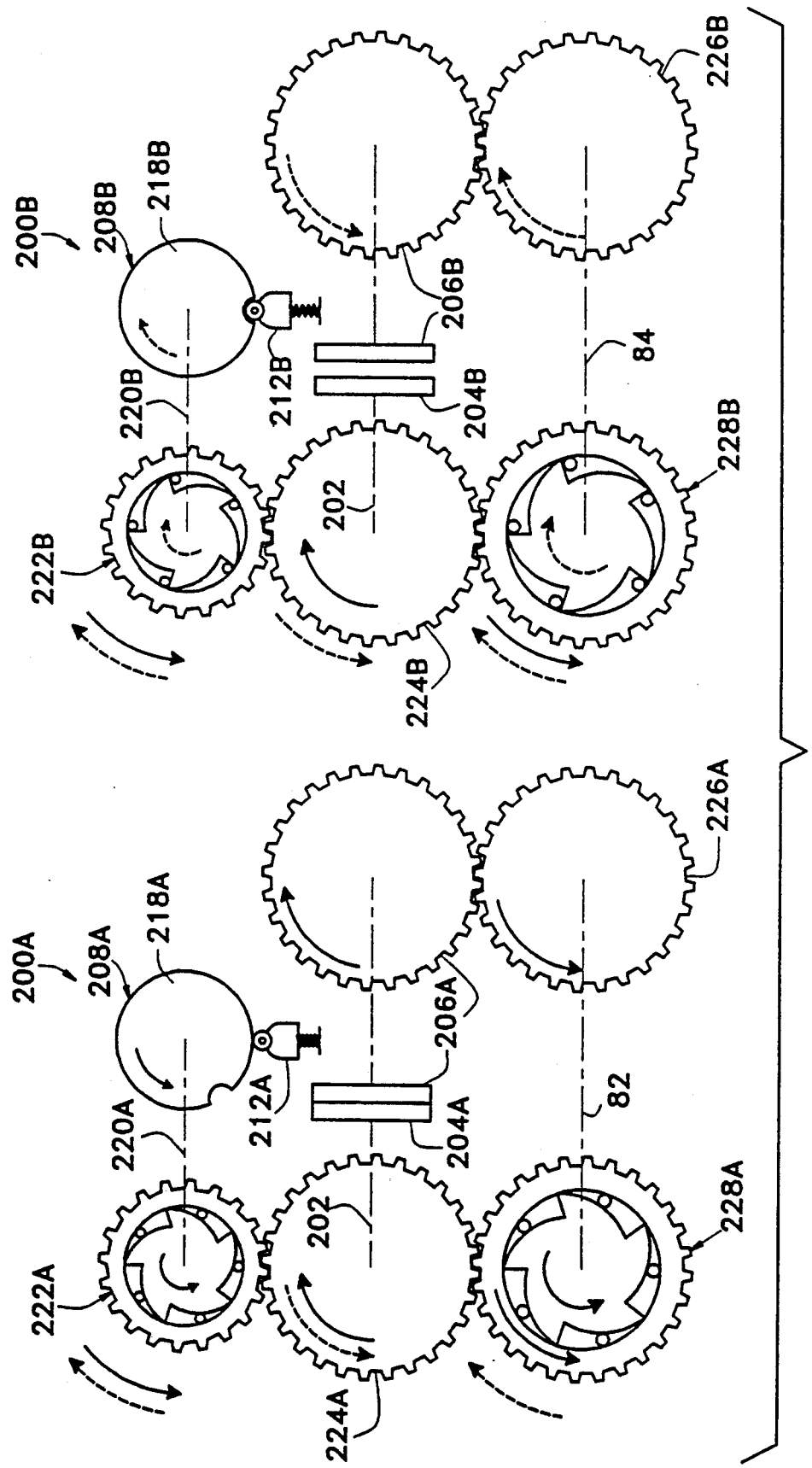
FIG. 14 is a diagrammatic view of the clutch arrangement shown in FIG. 13 for use in explaining operation thereof.

Obviously, the invention is not limited to electromagnetic friction clutches in the connection of the piston shaft to the counterrotating output shafts. In FIGS. 13 and 14, to which reference now is made, mechanically operated clutches 200A and 200B are shown for connection of an oscillating shaft 202 to counterrotating output shafts 82 and 84, respectively. Shaft 202 may correspond to oscillating idler shaft 66, or to oscillating piston shaft 50, in the arrangements described above. Clutches 200A and 200B include plates 204A and 204B affixed to oscillating shaft 202, and plates 206A and 206B in the form of spur gears rotatably supported on shaft 202. Clutch actuating means 208A and 208B for controlling engagement and disengagement of the clutches include thrust bearings 210A and 210B on oscillating shaft 202 which are axially movable therealong under control of pivotal clutch actuating levers 212A and 212B, respectively. Springs 214A and 214B resiliently bias the levers in a clockwise direction, as viewed in FIG. 13, about pivot pins 216A and 216B and into engagement with cams 218A and 218B, respectively. In the drawings, clutch 200A is shown in the engaged condition, and clutch 200B is shown in the released condition.

Cams 218A and 218B are affixed to idler shafts 220A and 220B, respectively, which are intermittently rotated by oscillating shaft 202 through one-way clutches 222A and 222B of any suitable design. Clutches 222A and 222B include gear wheels which are driven by gears 224A and 224B, respectively, attached to oscillating shaft 202. As shown in FIG. 14, oscillating motion of shaft 202 is converted by one-way clutch 222A to intermittent rotation of cam 218A in a counterclockwise direction, and by one-way clutch 222B to intermittent rotation of cam 218B in a clockwise direction. For each oscillating movement of shaft 202 in the clockwise direction, cam 218A is rotated one complete revolution in the counterclockwise direction. During rotation of shaft 202 in the counterclockwise direction, one-way clutch 222A operates in the overrunning condition whereby cam 218A remains stationary. Similarly, cam 218B is rotated one complete revolution upon oscillating movement of shaft 202 in a counterclockwise direction through clutch 222B, and remains stationary during clockwise rotation of shaft 202.

Spur gears 206A and 206B of clutches 200A and 200B are coupled to outer and inner shafts 82 and 84 through spur gears 226A and 226B, respectively. As with all other arrangements, coaxial output shafts are interconnected through rotational direction reversing means 88 (see FIG. 1) for rotation of the shafts in counterrotating directions. Although not required, oscillating shaft 202 may also be connected to output shafts 82 and 84 through one-way clutches 228A and 228B, respectively, which may be of the same type as one-way clutches 110 and 112 shown in FIG. 1 and described above. One-way clutches 228A and 228B are in shunt with mechanically actuated clutches 200A and 200B, respectively. The one-way clutches operate in overrunning condition when shafts 82 and 84 function as driving shafts and shaft 202 functions as the driven shaft during, say, engine starting. On the other hand, mechanically actuated clutches 200A and 200B function to interconnect coaxial output shafts 82 and 84 to oscillating shaft 202 under all operating condition regardless of whether oscillating shaft 202 functions as the driving shaft or the driven shaft.

As seen in FIG. 14, cams 218A and 218B are provided with a depression which allows for disengagement of the clutches when entered by levers 212A and 212B, respectively. In the operating condition illustrated in FIG. 14, wherein shaft 202 is shown rotating in a clockwise direction, lever 212A engages the raised surface of cam 218A for engagement of clutch 200A, and lever 212B engages the depression in cam 218B for disengagement of clutch 200B. When oscillating shaft 202 reaches the end of travel in the clockwise direction, cam 218A will have been driven through one-way clutch 222A to the position wherein lever arm 212A enters the depression on the cam surface whereby clutch 200A is moved to the disengaged condition. When oscillating shaft 202 begins rotation in the counterclockwise direction, cam 218B is rotated through one-way clutch 222B. As cam 218B is rotated from the position shown in FIG. 14, lever arm 212B is pivoted so as to move clutch 200B into the engaged condition. While cam 218B is being driven by rotation of shaft 202 in the counterclockwise direction, cam 218A remains stationary since one-way clutch 222A now functions in the overrunning mode. The operation continues such that clutch 200A is actuated into engaged condition during rotation of shaft 202 in a clockwise direction during which time clutch 200B is disengaged, and clutch 200B is actuated into engaged condition during rotation of shaft 202 in a counterclockwise direction during which time clutch 200A is disengaged. With this arrangement, oscillating movement of oscillating shaft 202 in an amount sufficient to produce one complete revolution of cams 218A and 218B is required every time the cams are rotated through one-way clutches 222A and 222B, respectively.

Reference now is made to FIG. 15 wherein another modified form of this invention is shown which includes an oscillating shaft 66 and counterrotating coaxial shafts 82 and 84 of the type shown in FIG. 1 and described above. Gear sets 102 and 104 connect oscillating shaft 66 to outer shaft 82, and gear sets 106 and 108 connect oscillating shaft 66 to inner shaft 84. As with the arrangement illustrated in FIG. 1, gear sets 102 and 106 include one-way overrunning clutches 110 and 112, respectively, and gear sets 104 and 108 include electromagnetically controlled friction clutches 118 and 120, respectively. As with the other embodiments which include counterrotating coaxial shafts 82 and 84, means, such as means 88 shown in FIG. 1 are provided for interconnecting the same for simultaneous counterrotation thereof upon rotation of either shaft.

When oscillating shaft 66 functions as the driving shaft, outer coaxial shaft 82 is intermittently driven in a counterclockwise direction, as viewed from the right, through one-way clutch means 110, and inner coaxial shaft 84 is intermittently driven in the opposite direction through one-way clutch 112, in a manner described above with reference to FIG. 1. Electromagnetically controlled friction clutches 118 and 120 are operated in the same manner as clutches 118 and 120 in the FIG. 12 arrangement. As seen in FIG. 16, switching control circuit 164 functions to alternately open and close switches 154 and 154A included in energization circuits for clutches 118 and 120. When ignition controlled switch 153 is closed, opening and closing of switches 154 and 154A controls engagement and disengagement of clutches 118 and 120, respectively. As noted above, with this arrangement, clutches 118 and 120 operate either for transmission of power from shaft 66 to coaxial shafts 82 and 84, or for transmission of power to shaft 66 from coaxial shafts 82 and 84, whereas overrunning one-way clutches 110 and 112 only function to transmit power from shaft 66 to shafts 82 and 84, respectively.

Referring again to FIG. 15, this embodiment of the invention is shown to include an overrunning clutch 230 and electromagnetically controlled friction clutch 232 in parallel in the connection of rotating shaft 84 to an output shaft 234. Output shaft 234 is, in turn, connected to the vehicle transmission 117. When rotating shaft 84 functions as the driving shaft, and shaft 234 as the driven shaft, rotation of shaft 84 by operation of the associated internal combustion engine is transmitted to shaft 234 by one-way overrunning clutch 230. When shaft 84 does not function as the driving shaft, one-way overrunning clutch 230 operates in the overrunning condition. As seen in FIG. 16, the energization circuit for electromagnetically controlled friction clutch 232 includes a switch 236 under control of clutch control circuit 238. Clutch 232 is energized by closure of switch 236 which enables shaft 234 to function as the driving shaft and shaft 84 as the driven shaft. Engine compression may be controlled under certain conditions by controlling energization and deenergization of clutch 232 so as to control the extent of pivotal movement of the engine piston during oscillating movement thereof. Also, as described above, engine braking of the vehicle may be provided by engagement of clutch 232 when transmitting power from shaft 234 to shaft 84.

Figure 17:
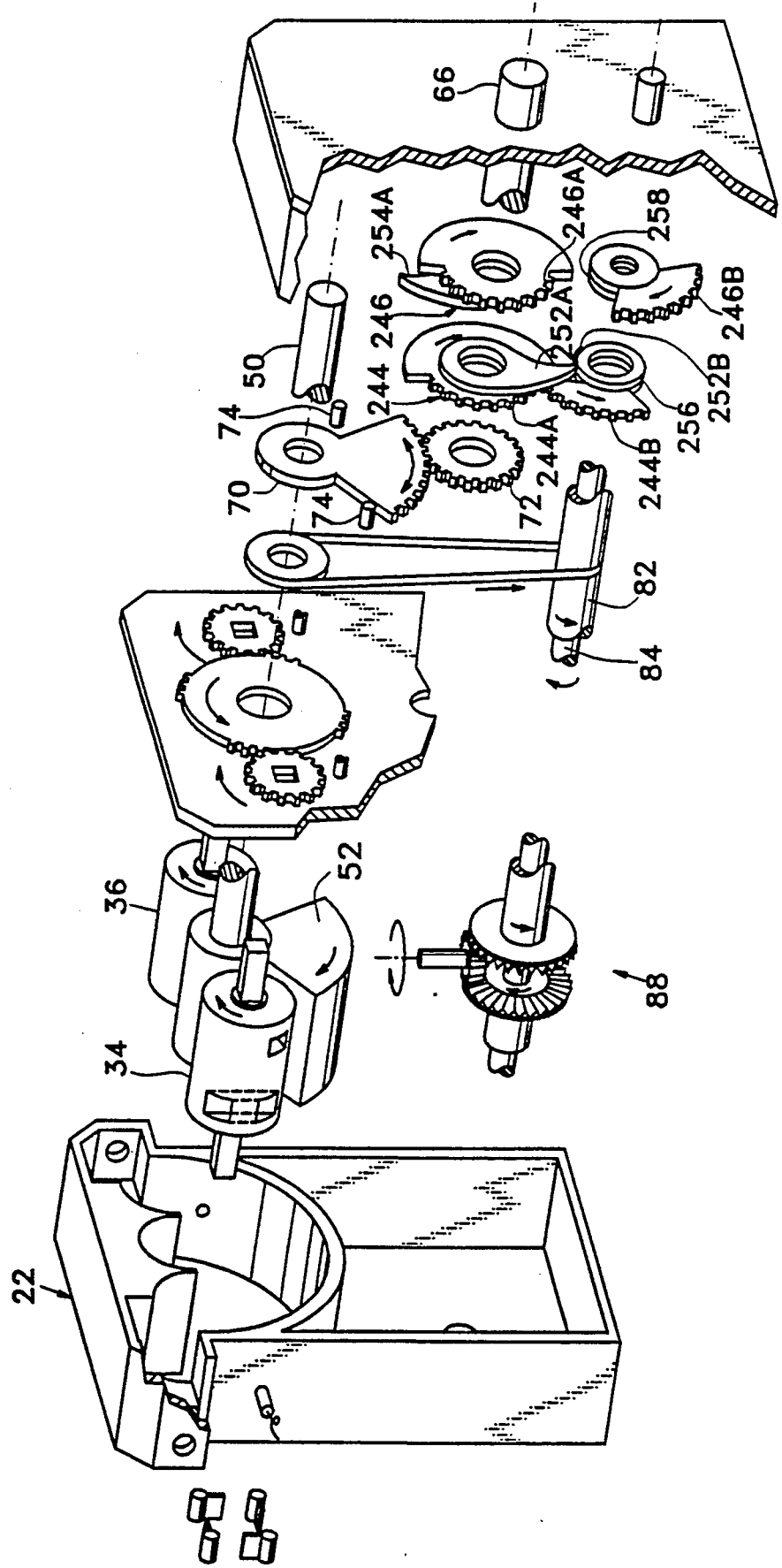
FIG. 17 is an exploded isometric view which is similar to that of FIGS. 1A and 1B but showing another modified form of this invention which includes first and second pairs of sector gears in the drive train.

Another modified form of this invention is shown in FIG. 17, to which figure reference now is made. There, an oscillating piston engine which includes combustion unit 22, shaft 50 to which oscillating piston 52 is attached, and rotary valves 34 and 36 of the same type shown in FIG. 1 and described above is shown. Also, as with the FIG. 1 arrangement, oscillating motion of shaft 50 is transmitted to idler shaft 66 through sector gear 70 attached to shaft 50 and a cooperating gear 72 attached to shaft 66. Oscillating motion of idler shaft 66 is converted to counterrotating motion of coaxial shafts 82 and 84 which are interconnected by means 88 for simultaneous rotation of shafts 82 and 84 upon rotation of either shaft. With this embodiment, oscillating shaft 66 is adapted for connection to outer shaft 82 through sector gear set 244, and to inner shaft 84 through sector gear set 246. Sector gear set 244 includes sector gear 244A affixed to oscillating shaft 66, and associated sector gear 244B affixed to outer coaxial shaft 82. Similarly, sector gear set 246 includes sector gear 246A affixed to oscillating shaft 66, and associated sector gear 246B affixed to inner coaxial shaft 82. During rotation of oscillating shaft 66 in a clockwise direction as viewed in FIG. 17, sector gears 244A and 244B engage for drive actuation of outer shaft 82 in a counterclockwise direction. Similarly, during rotation of oscillating shaft 66 in a counterclockwise direction, sector gears 246A and 246B engage for drive actuation of inner shaft 84 in a clockwise direction. Near the ends of pivotal movement of shaft 66 by the oscillating piston, both sector gear sets 244 and 246 are disengaged for transition of operation between the gear sets.

Figure 18:
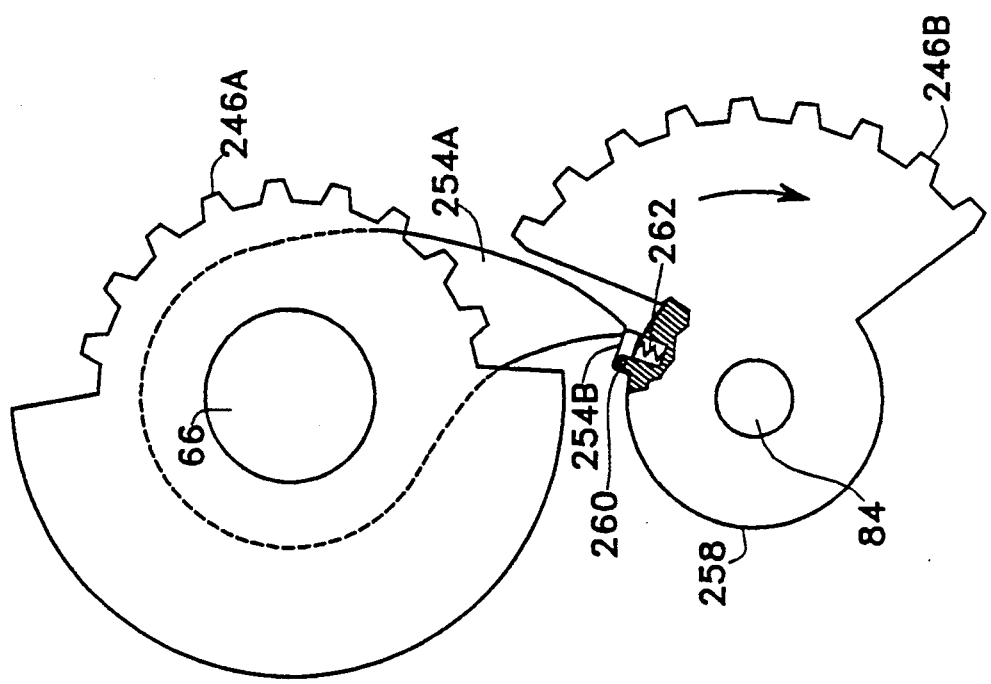
FIG. 18 is an enlarged side elevational view, with parts shown broken away for clarity, of one of the pairs of sector gears employed in the FIG. 17 embodiment.

When sector gear sets 244 and 246 are disengaged rotary movement of oscillating shaft 66 is limited by the above-mentioned stop means 74,74, and by cooperating detent means affixed to oscillating shaft 66 and rotating shafts 82 and 84. The detent means include first and second radially extending arms 252A and 254A affixed to oscillating shaft 66, which extend radially outwardly beyond spur gears 244A and 246A attached to shaft 66. Arms 252A and 254A are adapted for engagement with radially extending members 252B and 254B, respectively, attached to hubs 256 and 258 affixed to counterrotating shafts 82 and 84, respectively. In FIG. 17, only one of the members 252B is visible. In FIG. 18, to which reference now is made, detent member 254B is shown pivotally attached to hub 258 for limited pivotal movement about pivot pin 260. Spring 262 resiliently biases member 254B for outward pivotal movement from shaft 84 into the full line position shown in FIG. 18. It will be apparent that in the rotary position of shaft 84 shown in FIG. 18, engagement between arm 254A and member 254B will limit rotary movement of shaft 66 in a clockwise direction until shaft 84 rotates a sufficient amount in the clockwise direction for disengagement of said arm and member. During this time, rotation of shaft 66 in a counterclockwise direction is limited by engagement of sector gear 70 with one of the stop members 74. When detent members 254A and 254B disengage, sector gears 244A and 244B will have reengaged. Detent member 252B is of the same type as detent member 254B shown in detail in FIG. 18.

Figure 20:
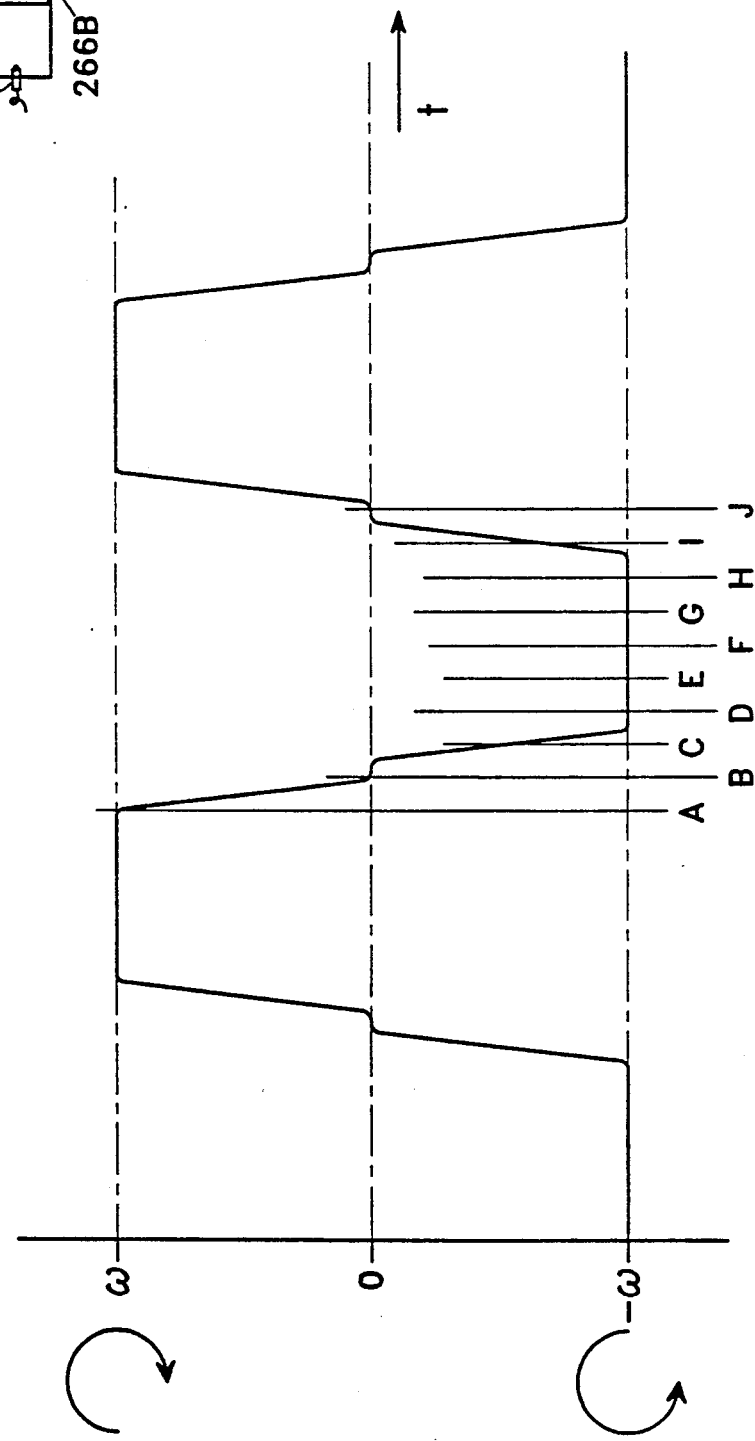
FIG. 20 is a timing diagram which is similar to that of FIG. 10 for relating the angular positions of the sector gears shown in FIGS. 19A through 19J with an engine operating cycle.

Operation of the sector gear and detent mechanism for converting oscillating motion of shaft 66 to counterrotating motion of coaxial shafts 82 and 84 now will be described with reference to FIGS. 19A through 19J of the drawings. Operation of the combustion unit 22 for driving piston shaft 50 and idler shaft 66 with an oscillating motion is the same as that described above with reference to FIGS. 1A and 1B, and that description is not repeated here. In FIG. 20, rate of rotation of oscillating idler shaft 66 versus time is shown together with times A through J during a portion of an operating cycle, at which times shaft 66 is rotating in a clockwise direction (time A), is stopped at one end of travel (time B), rotates in a counterclockwise direction (times C through I) and is stopped at the opposite end of travel (time J). Shaft positions shown in FIGS. 19A through 19J correspond to respective times A through J in FIG. 20.

In FIG. 19A, shaft 66 is nearing the end of rotation in a clockwise direction, at a point where sector gears 244A and 244B begin to disengage. At FIG. 19B, where motion of shaft 66 is stopped, sector gears 244A and 244B of sector gear set 244, and sector gears 246A and 246B of sector gear set 246 are momentarily disengaged. However, pivotal movement of oscillating shaft 66 in a counterclockwise direction is prevented by engagement of arm 252A with member 252B of the detent means as illustrated in FIG. 19B. Only when shaft 82 has rotated to a position wherein arm 252A is disengaged by member 252B is shaft 66 free for pivotal movement in a counterclockwise direction. When arm 252A is released from engagement with detent member 252B, gear sector 246B engages gear sector 246A for rotation of attached shaft 84 in a clockwise direction by oscillation of sector gear 246A in a counterclockwise direction. Sector gears 246A and 246B remain in engagement throughout movement depicted from FIG. 19C through FIG. 19I. At the end of pivotal movement of shaft 66 and attached sector gears 244A and 246A in the counterclockwise direction, arm 254A attached to shaft 66 is adapted for engagement with member 254B attached to shaft 84 to prevent the start of clockwise movement of shaft 66. Detent arm 254A is released from engagement with detent member 254B when shaft 84 rotates an additional amount, at which time sector gears 244A and 244B are again engaged. With this arrangement, oscillating shaft 66 may comprise the drive shaft and shafts 82 and 84 intermittently driven shafts, or shafts 82 and 84 may function as drive shafts and shaft 66 as the driven shaft.

As noted above, with conventional reciprocating piston engines wherein the pistons are connected to a crankshaft through connecting rods, torque supplied to the crankshaft is substantially zero at the time of ignition since the effective length of the crank arm is substantially zero at this time. With the above-described oscillating piston engine torque at output shafts 82 and 84 is primarily dependent upon forces on the pistons independently of the piston position.

Figure 21:
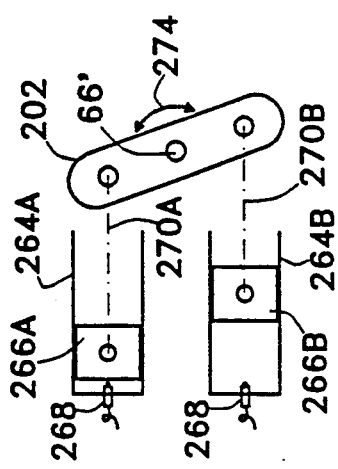
FIG. 21 is a diagrammatic view of a modified form of engine having an oscillating shaft for use with motion converting means of this invention.

Advantages of this invention also may be obtained by converting reciprocating motion of a reciprocating piston engine to oscillating shaft motion, which motion then is converted to counterrotating shaft motion in a manner described above. Use of an oscillating piston engine is not required to obtain advantages of the present invention. In FIG. 21, to which figure reference now is made, a reciprocating piston engine is shown which includes first and second cylinders 264A and 264B and reciprocating pistons 266A and 266B within the cylinders. The cylinders are provided with spark plugs 268, and intake and exhaust valves, not shown, of conventional design. Pistons 266A and 266B are connected by connecting rods 270A and 270B to opposite ends of a rocking arm 272 which, in turn, is affixed to a pivotally mounted shaft 66'. Reciprocating motion of pistons 266A and 266B is converted to oscillating motion of shaft 66' in the direction of double headed arrow 274. Even at the top dead center positions of the pistons, substantial torque may be applied to shaft 66' by the pistons through the connecting rods 270A and 270B and pivotal arm 272. Oscillating shaft 66' corresponds to shaft 66 in the above-described embodiments of the invention, and any of the above-described means for converting oscillating movement to rotary movement may be employed with the FIG. 21 arrangement for converting oscillating movement of shaft 66' to rotary movement.

Figure 22:
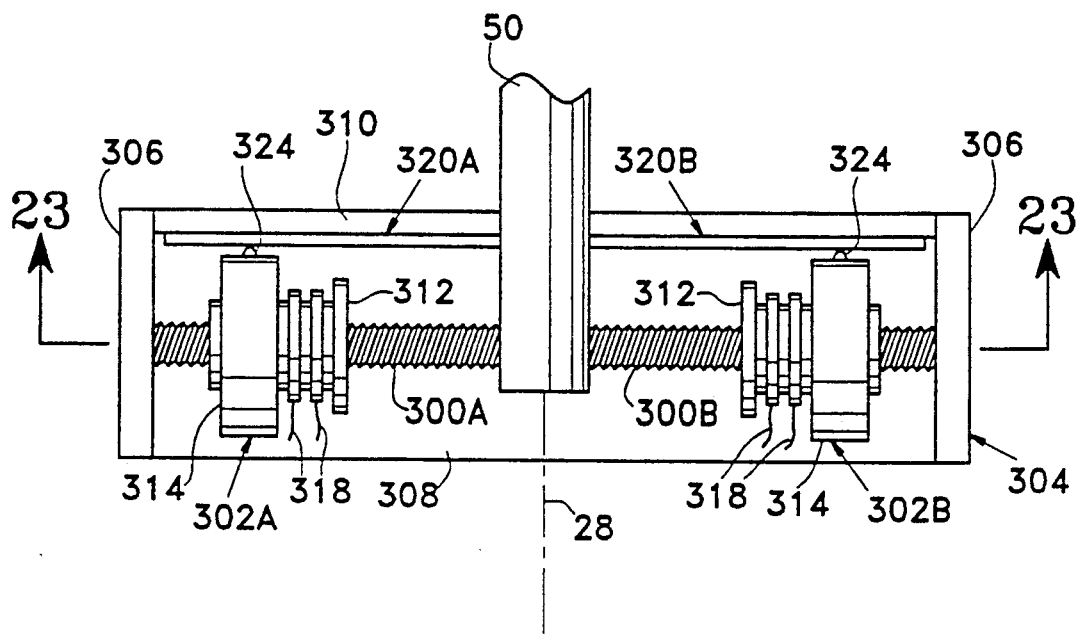
FIG. 22 is a fragmentary plan view showing means for varying the moment of inertia, I, of the oscillating piston engine of this invention.
Figure 23:
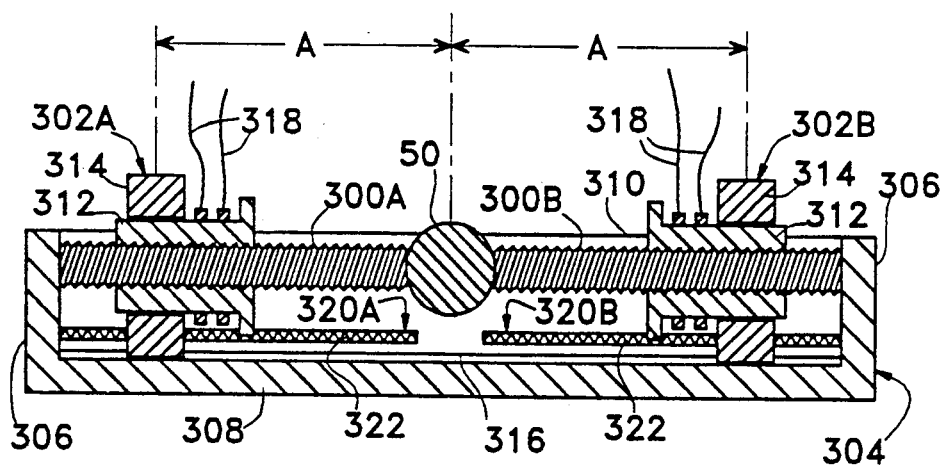
FIG. 23 is a sectional view taken substantially along line 23—23 of FIG. 22.

As noted above, the engine of this invention is provided with a conventional flywheel, not shown, to steady the speed of rotating output shafts 82 and 84. With the present invention, which includes oscillating shaft movement that is converted to rotary motion, it also is desirable to control the moment of inertia of the oscillating shaft during engine operation to facilitate complete oscillatory movement of the oscillating shaft. Means for controlling the moment of inertia of an oscillating shaft, such as piston shaft 50, is shown in FIGS. 22 and 23, to which figures reference now is made. There, oscillating engine shaft 50 is shown provided with a pair of diametrically opposed, radially extending, threaded arms 300A and 300B which carry weights 302A and 302B, respectively. The weights are axially movable along said arms for control of the moment inertia of oscillating shaft 50 about shaft axis 28.

A frame 304 is attached to the thread arms 300A and 300B, which frame includes opposite end walls 306, 306 affixed to the outer ends of the threaded arms. Base and side walls 308 and 310, respectively, of the frame extend between the end walls 306, 306. In accordance with the present invention, weights 302A and 302B comprise reversible motors, each of which motors includes a rotatable armature 312 and associated stator 314. The armatures are provided with a threaded axial through hole threadedly engaged with the threaded arms 300A and 300B. The stators are prevented from rotation by slidable engagement thereof with a groove 316 formed in base member 308. The motors are axially movable along the threaded arms 300A and 300B by rotation of armatures 312 upon energization thereof through motor input leads 318. They are of the reversible type for rotation of the armatures in either rotary direction and, therefore, movement of the motors in either direction along the threaded arms. As is well understood, the moment of inertia, I, of the mechanism increases as the weights, here motors 302A and 302B, are moved outwardly from the axis 28 of oscillating shaft 50, and decreases as they are moved inwardly toward axis 28. In FIG. 23, the motors are shown positioned a distance "A" from axis 28.

Means are provided for sensing, or measuring, the distance "A" for each of the motors. For purposes of illustration only, and not by way of limitation, position sensing means includes potentiometers 320A and 320B each of which comprises a resistance element 322 carried by wall 310 and associated movable contact 324 (FIG. 22) carried by the motors. The potentiometers are included in well known circuitry, not shown, the output from which provides a measure of distance "A" from oscillating shaft 50.

Figure 24:
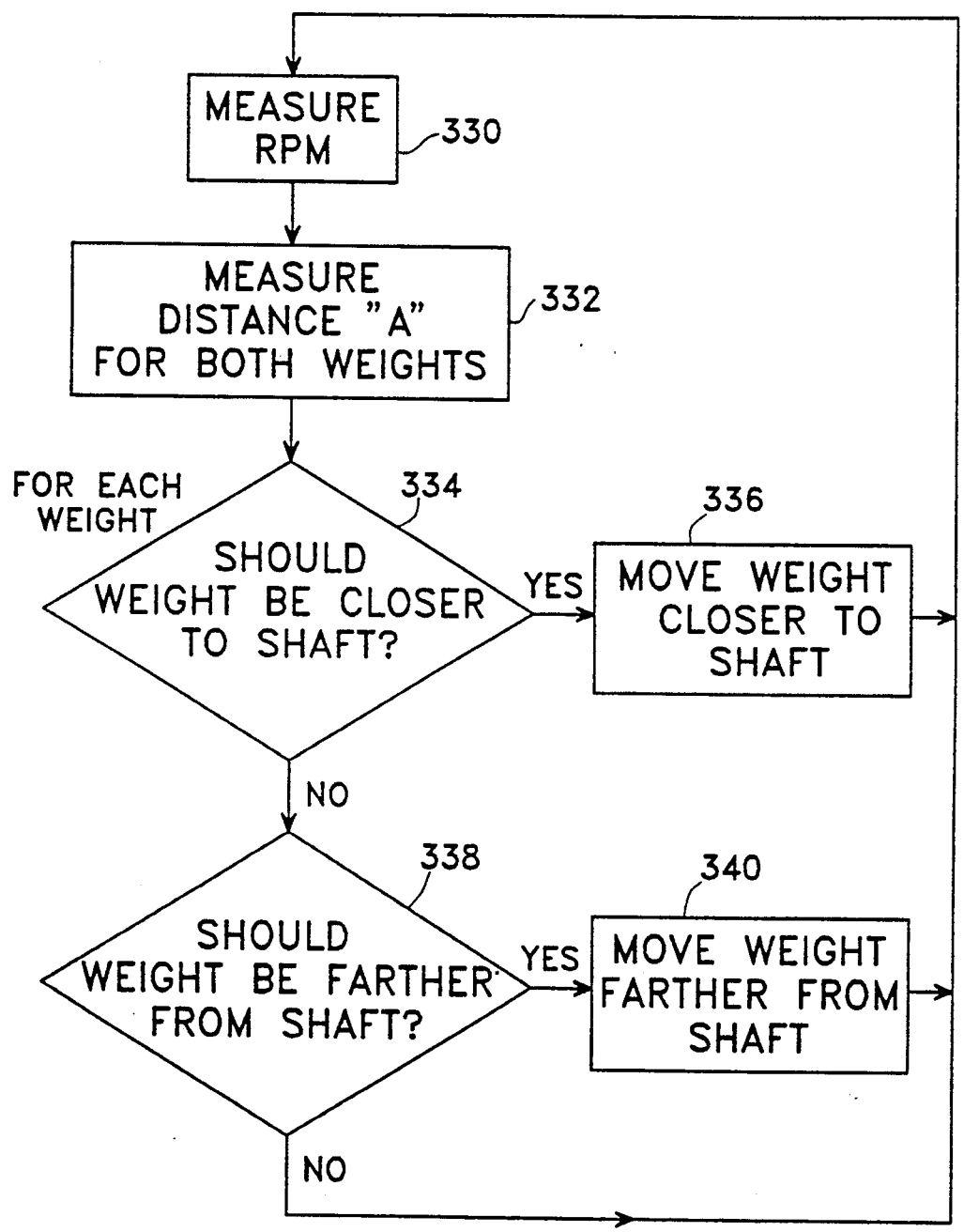
FIG. 24 is a flow diagram for control of movement of weights from the center of rotation for controlling the moment of inertia of the engine shown in FIGS. 22 and 23.

Reference now is made to FIG. 24 wherein a flow diagram of operation of the variable moment of inertia system of this invention is shown. During operation of the engine the rate of rotation of one of the engine's counterrotating output shafts 82 and 84 is measured as indicated at measure RPM step 330, as by use of a tachometer, not shown. At step 332, the distance "A" of both weights 302A and 302B from the center of rotation 28 is measured using measuring means 320A and 320B. Decision step 334 is entered where, for each weight, it is determined whether or not the weight should be moved closer to shaft 50 so as to reduce the moment of inertia of the oscillating system. As described above, at low operating speeds, the moment of inertia is increased to facilitate movement of the oscillating piston from one end of travel to the opposite end. By controlling the moment of inertia, the angle through which the piston operates is maintained substantially the same through all engine operating speeds. As engine speed increases from a low engine speed, decision step is affirmative in which case step 336 is entered for movement of the weights closer to shaft 50 for reduction in the moment of inertia. Operation then returns to step 330 from step 336.

If step 334 is negative, decision step 338 is entered where, for each weight, it is determined whether or not the weight should be moved farther from shaft 50 so as to increase the moment of inertia. If decision step 338 is affirmative, step 340 is entered where the weights are moved farther from shaft 50 for an increase in the moment of inertia. From step 340, step 330 is reentered. If decision step 338 is negative, step 330 is reentered directly from step 338 and the entire process is repeated.

Where the above-described variable moment of inertia system is directly attached to piston shaft 50, as shown in FIGS. 22 and 23, the weights undergo the same angular travel as the oscillating piston. If desired, the variable moment of inertia system may be connected to the oscillating piston through a gear train, or the like, to provide the system with a larger angular rotation and angular speed than that of the oscillating piston. With such an arrangement, smaller weights may be employed while still providing the system with the same kinetic energy as that of the illustrated arrangement.

The invention having been described in detail in accordance with requirements of the patent statutes, various other changes and modifications will suggest themselves to those skilled in the art. For example, in the FIG. 15 embodiment, one-way clutches 110 and 112 and associated gear sets 102 and 106 may be eliminated from the arrangement in which case transmission of movement between oscillating shaft 66 and counterrotating shafts 82 and 84 would be solely dependent upon alternate energization and deenergization of clutches 118 and 120 Obviously, where electromagnetically controlled friction clutches are employed, the invention is not limited to use of the illustrated clutches. Many different forms of electromagnetically controlled clutches are known which are suitable for use in this invention. Similarly, other prior art one-way overrunning clutches may be employed, the invention not being limited to the use of one-way overrunning clutches of the illustrated type. In place of circular gears, elliptical gears may be used if desired. Also, operation of the engine using compression ignition is contemplated in which case air, not an air/fuel mixture, is supplied to the engine through inlet ports 44, and no spark plugs 58 are provided. High pressure fuel injectors are located at points that the spark plugs were located. When the sub-chambers reach substantially maximum pressure, minimum volume condition, fuel is sprayed into the sub-chambers, which fuel is ignited by the high temperature of the compressed air for start of the power phase. Additionally, the engine may be provided with a flywheel in the manner of conventional engines to smooth rotation of the counterrotating shafts. Instead of attaching gear 72 directly to idler shaft 66, such connection may include first and second meshing eccentric elliptical gears arranged so that idler shaft 66 is driven at a fastest rate when at the center of oscillatory movement, and at a slower rate when adjacent opposite ends of travel. Also, sector gear 70 may be provided with one or more arms which extend radially outwardly a distance greater than the radius of the gear sector, which arm, or arms, are adapted to engage relocated stop means at opposite ends of piston travel. It is intended that such changes and modifications shall fall within the spirit and scope of the invention defined in the appended claims.

I claim:

1. An internal combustion engine for use with a vehicle, or the like, comprising,
    a cylinder housing formed with a working chamber,
    a movable piston within the working chamber,
    an oscillating shaft coupled to the piston and driven by the piston with an oscillating motion,
    first and second counterrotating shafts rotatable in first and second opposite directions, respectively,
    means for alternately connecting said oscillating shaft to said first and second shafts for drive rotation of the first shaft in said first direction upon oscillation of the oscillating shaft in one direction, and for drive rotation of the second shaft in said second direction upon oscillation of the oscillating shaft in the opposite direction, and
    means for interconnecting said first and second shafts for simultaneous counterrotation thereof upon rotation of either one of said first and second shafts.

2. An internal combustion engine as defined in claim 1 wherein said means for alternately connecting said oscillating shaft to said first and second shafts includes,
    first and second actuatable clutch means operable between engaged and disengaged conditions for connecting said oscillating shaft to said first and second shafts, respectively, and clutch actuating means for controlling operation of said first and second actuatable clutch means between said engaged and disengaged conditions for alternately connecting said oscillating shaft to said first and second shafts.

3. An internal combustion engine as defined in claim 2 wherein said first and second actuatable clutch means comprise electromagnetically controlled friction clutches, and said clutch actuating means comprises means for controlling energization and deenergization of the electromagnetically controlled friction clutches.

4. An internal combustion engine as defined in claim 3 including means for sensing the rotary position of the oscillating shaft for use in controlling energization and deenergization of said electromagnetically controlled friction clutches.

5. An internal combustion engine as defined in claim 4 including means for connecting one of said first and second shafts to transmission means for use in transmission of power from said one shaft to vehicle wheels.

6. An internal combustion engine as defined in claim 5 wherein said means for connecting one of said first and second shafts to transmission means comprises, a third electromagnetically controlled friction clutch and a one-way overrunning clutch in shunt therewith, which one-way overrunning clutch provides drive rotation from said one first and second shaft to said transmission means, means for controlling energization and deenergization of said third electromagnetically controlled clutch for controlling engagement and disengagement thereof.

7. An internal combustion engine as defined in claim 2 wherein said first and second actuatable clutch means comprise mechanically controlled clutches and said clutch actuating means comprise mechanical means for controlling engagement and disengagement of said clutch means.

8. An internal combustion engine as defined in claim 7 wherein said clutch actuating means comprise cam means intermittently driven by said oscillating shaft, and first and second cam followers cooperating with said cam means and operatively connected to said mechanically controlled clutches for controlling engagement and disengagement thereof.

9. An internal combustion engine as defined in claim 2 wherein said means for alternately connecting said oscillating shaft to said first and second shafts also includes, first and second one-way clutch means in shunt with said first and second actuatable clutch means, respectively.

10. An internal combustion engine as defined in claim 9 including means for maintaining said first and second actuatable clutch means in disengaged condition during rotation of said first and second shafts by said oscillating shaft through said first and second one-way clutch means.

11. An internal combustion engine as defined in claim 10 including means for enabling operation of said first and second actuatable clutch means during drive actuation of said oscillating shaft by said first and second shafts.

12. An internal combustion engine as defined in claim 1 wherein said means for alternately connecting said oscillating shaft to said first and second shafts includes, first and second sector gears affixed to said oscillating shaft for oscillating movement therewith, and third and fourth sector gears affixed to said first and second shafts, respectively, said first and third sector gears and said second and fourth sector gears being alternately engaged and disengaged during oscillating movement of said oscillating shaft.

13. An internal combustion engine as defined in claim 12 wherein both said first and third sector gears and said second and fourth sector gears are simultaneously disengaged adjacent opposite ends of travel of said oscillating shaft, and including first and second detent means between the oscillating shaft and said first and second counterrotating shafts, respectively, for limiting rotary movement of said oscillating shaft during simultaneous disengagement of the first and third sector gears and the second and fourth sector gears.

14. An internal combustion engine as defined in claim 13 wherein said first and second detent means comprise first and second arms on said oscillating shaft and extending radially outwardly from the oscillating shaft axis a radial distance greater than the radius of said first and second sector gears, and first and second radially extending members on said respective first and second counterrotating shafts engagable with said first and second arms when the sector gears are disengaged.

15. An internal combustion engine as defined in claim 14 wherein said first and second radially extending members on said respective first and second counterrotating shafts are pivotally attached to said shafts, and means for resiliently biasing said first and second radially extending members for outward pivotal movement thereof from said first and second shafts.

16. An internal combustion engine as defined in claim 1 wherein said piston oscillates within the working chamber and divides said working chamber into first and second sub-chambers, first and second rotary valve means for controlling the flow of fluid into and out of said first and second sub-chambers, respectively, each rotary valve means including separate intake and exhaust passages therethrough, means for intermittently rotating said rotary valve means substantially 90 degrees when the oscillating piston is adjacent opposite ends of travel, for every two complete oscillations of the piston each said valve means completing 360 degrees rotation during which one complete operating cycle is completed at each of the sub-chambers, each sub-chamber operating cycle including successive intake, compression, expansion and exhaust phases.

17. An internal combustion engine as defined in claim 1 including, first and second axially aligned partially cylindrical working chambers, first and second axially aligned piston shafts extending through said respective first and second working chambers, first and second pistons affixed to said first and second piston shafts in said first and second working chambers, respectively, for pivotal movement therewithin, and means for interconnecting said first and second piston shafts for simultaneous counterrotation thereof upon rotation of either piston shaft such that one piston is at one end of piston travel when the other piston is at the opposite end.

18. An internal combustion engine as defined in claim 1 wherein said first and second shafts are coaxial.

19. An internal combustion engine as defined in claim 1 including rotatable means having a variable moment of inertia connected to said oscillating shaft for oscillating motion in synchronism with said oscillating shaft, and means for controlling the moment of inertia of said rotatable means dependent upon the rate of rotation of said first and second counterrotating shafts.

20. An internal combustion engine as defined in claim 19 wherein the moment of inertia of said rotatable means is increased during low rate of rotation of said first and second counterrotating shafts.

21. An internal combustion engine as defined in claim 20 wherein said rotatable means includes first and second diametrically opposed threaded arms extending from the center of rotation thereof, and first and second motors threadedly attached to said respective first and second threaded arms, and movable along said arms upon energization thereof for control of the moment of inertia during operation of the engine.

* * * * *